US008560475B2

(12) United States Patent
Hussain et al.

(10) Patent No.: US 8,560,475 B2
(45) Date of Patent: Oct. 15, 2013

(54) CONTENT SEARCH MECHANISM THAT USES A DETERMINISTIC FINITE AUTOMATA (DFA) GRAPH, A DFA STATE MACHINE, AND A WALKER PROCESS

(75) Inventors: Muhammad R. Hussain, Pleasonton, CA (US); David A. Carlson, Haslet, TX (US); Gregg A. Bouchard, Round Rock, TX (US); Trent Parker, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 1674 days.

(21) Appl. No.: 11/224,728

(22) Filed: Sep. 12, 2005

(65) Prior Publication Data

US 2006/0085533 A1    Apr. 20, 2006

Related U.S. Application Data

(60) Provisional application No. 60/609,211, filed on Sep. 10, 2004, provisional application No. 60/669,583, filed on Apr. 8, 2005.

(51) Int. Cl.
*G06F 17/00* (2006.01)

(52) U.S. Cl.
USPC .......................................................... 706/45

(58) Field of Classification Search
USPC .................. 715/736; 709/223; 706/12, 45, 62
See application file for complete search history.

(56) References Cited

U.S. PATENT DOCUMENTS 5,230,061 A    7/1993  Welch
5,327,544 A    7/1994  Lee et al.
6,047,283 A    4/2000  Braun
6,076,087 A    6/2000  Suciu
6,192,282 B1 *  2/2001  Smith et al. ..................... 700/19
6,493,698 B1   12/2002  Beylin (Continued)

FOREIGN PATENT DOCUMENTS

| EP | 1607823 A2 | 12/2005 |
| WO | WO2004/013777 A1 | 2/2004 |
| WO | WO 2006/031659 A2 | 3/2006 |
| WO | WO 2009/070191 A1 | 6/2009 |
| WO | WO2009/070192 A1 | 6/2009 |

OTHER PUBLICATIONS

Melvin, S., et al., "A Massively Multithreaded Packet Processor," Paper presented at NP2: Workshop on Network Processors, held in conjunction with The 9th International Symposium on High-Performance Computer Architecture, Anaheim, CA (Feb. 2003).

(Continued)

*Primary Examiner* — David Vincent
(74) *Attorney, Agent, or Firm* — Hamilton, Brook, Smith & Reynolds, P.C.

(57) ABSTRACT

An improved content search mechanism uses a graph that includes intelligent nodes avoids the overhead of post processing and improves the overall performance of a content processing application. An intelligent node is similar to a node in a DFA graph but includes a command. The command in the intelligent node allows additional state for the node to be generated and checked. This additional state allows the content search mechanism to traverse the same node with two different interpretations. By generating state for the node, the graph of nodes does not become exponential. It also allows a user function to be called upon reaching a node, which can perform any desired user tasks, including modifying the input data or position.

18 Claims, 15 Drawing Sheets

(56) References Cited

U.S. PATENT DOCUMENTS

| | | |
|---|---|---|
| 6,925,641 B1 | 8/2005 | Elabd |
| 6,952,694 B2 | 10/2005 | Mathur et al. |
| 7,028,141 B2 | 4/2006 | Ohba |
| 7,046,848 B1 | 5/2006 | Olcott |
| 7,085,918 B2 | 8/2006 | Sharangpani et al. |
| 7,093,023 B2 | 8/2006 | Lockwood et al. |
| 7,185,081 B1 | 2/2007 | Liao |
| 7,188,168 B1 | 3/2007 | Liao |
| 7,225,188 B1 | 5/2007 | Gai et al. |
| 7,240,048 B2 | 7/2007 | Pontius |
| 7,249,149 B1 | 7/2007 | Eatherton et al. |
| 7,301,541 B2 | 11/2007 | Hansen et al. |
| 7,305,372 B2 | 12/2007 | Bridges et al. |
| 7,308,446 B1 | 12/2007 | Panigrahy et al. |
| 7,454,588 B2 | 11/2008 | Greicar |
| 7,565,380 B1 | 7/2009 | Venkatachary |
| 7,689,530 B1 | 3/2010 | Williams, Jr. et al. |
| 7,949,683 B2 | 5/2011 | Goyal |
| 8,180,803 B2 | 5/2012 | Goyal |
| 8,301,788 B2 | 10/2012 | Bouchard et al. |
| 8,392,590 B2 | 3/2013 | Bouchard et al. |
| 8,473,523 B2 | 6/2013 | Goyal |
| 2002/0099909 A1 | 7/2002 | Meyer |
| 2003/0051043 A1 | 3/2003 | Wyschogrod et al. |
| 2003/0065800 A1* | 4/2003 | Wyschogrod et al. ........ 709/230 |
| 2003/0110208 A1 | 6/2003 | Wyschogrod et al. |
| 2003/0195874 A1 | 10/2003 | Akaboshi |
| 2004/0049596 A1 | 3/2004 | Schuehler et al. |
| 2004/0059443 A1 | 3/2004 | Sharangpani |
| 2004/0071152 A1 | 4/2004 | Wolrich et al. |
| 2004/0083387 A1 | 4/2004 | Dapp et al. |
| 2004/0098384 A1 | 5/2004 | Min et al. |
| 2004/0162826 A1 | 8/2004 | Wyschogrod et al. |
| 2004/0172234 A1 | 9/2004 | Dapp et al. |
| 2004/0176945 A1 | 9/2004 | Inagaki et al. |
| 2004/0179477 A1 | 9/2004 | Lincoln et al. |
| 2004/0215593 A1 | 10/2004 | Sharangpani et al. |
| 2004/0225999 A1* | 11/2004 | Nuss .......................... 717/114 |
| 2004/0250045 A1 | 12/2004 | Dowling |
| 2004/0267779 A1 | 12/2004 | Carter et al. |
| 2005/0012521 A1 | 1/2005 | Sharangpani et al. |
| 2005/0097514 A1 | 5/2005 | Nuss |
| 2005/0108518 A1* | 5/2005 | Pandya ......................... 713/151 |
| 2005/0138276 A1 | 6/2005 | Navada et al. |
| 2005/0238010 A1* | 10/2005 | Panigrahy et al. ............ 370/389 |
| 2005/0238022 A1 | 10/2005 | Panigragy |
| 2005/0240999 A1 | 10/2005 | Rubin et al. |
| 2005/0251509 A1 | 11/2005 | Pontius |
| 2005/0273450 A1 | 12/2005 | McMillen et al. |
| 2006/0059165 A1 | 3/2006 | Bosloy et al. |
| 2006/0069872 A1 | 3/2006 | Bouchard et al. |
| 2006/0075206 A1 | 4/2006 | Bouchard et al. |
| 2006/0101195 A1 | 5/2006 | Jain |
| 2006/0242123 A1 | 10/2006 | Williams, Jr. |
| 2007/0038775 A1 | 2/2007 | Parekh et al. |
| 2007/0038798 A1 | 2/2007 | Bouchard et al. |
| 2007/0133593 A1 | 6/2007 | Shankara |
| 2007/0276788 A1 | 11/2007 | Cohen |
| 2008/0046423 A1 | 2/2008 | Khan et al. |
| 2008/0263665 A1 | 10/2008 | Ma et al. |
| 2009/0037379 A1 | 2/2009 | Bou-Diab et al. |
| 2009/0119399 A1 | 5/2009 | Hussain et al. |
| 2009/0138440 A1 | 5/2009 | Goyal et al. |
| 2009/0138494 A1 | 5/2009 | Goyal et al. |
| 2010/0114973 A1 | 5/2010 | Goyal |

OTHER PUBLICATIONS

Schuehler, David V., et al., "Architecture for a Hardware-Based, TCP/IP Content-Processing System," *IEEE Computer Society*, pp. 62-69 (Jan.-Feb. 2004).

Handout 1, "*Regular Expressions and Finite Automata*," pp. 1-8 http://www.developer.com/tech/article.php.

Bradley, Tony, "*Introduction to Intrusion Detection Systems (IDS)*," http://netsecurity.about.com/cs/hackertools/a/aa030504.htm and http://searchsecurity.techtarget. com/sDefinition/O,,sid14_gci295031,00.html.

Mertz, David, "*Learning to Use Regular Expressions, Introduction to the Tutorial*," Gnosis Software, http://gnosis.cx/publish/programming/regular_expressions.html, pp. 1-16, downloaded Jan. 11, 2005.

May 16, 2006, International Search Report, PCT/US2005/032236.

May 16, 2006, Written Opinion of the International Searching Authority, PCT/US2005/032236.

International Preliminary Report on Patentability for PCT/US2005/032236; Date Mailed: Mar. 13, 2007.

Ciura et al., "How to Squeeze a Lexicon," Software—Practice and Experience 2001; 31(11):1-11.

Lazzara, G., "Automata and performances", Technical Report, XP007921508, 130 pgs. (Jun. 2006).

Office Action for U.S. Appl. No. 11/982,433 dated Feb. 27, 2013.

International Search Report from PCT/US2008/011545 mailed on Mar. 2, 2009.

International Search Report from PCT/US2008/011543 mailed on Mar. 2, 2009.

Written Opinion for PCT/US2008/011545 mailed on Mar. 2, 2009.

Deshpande, P.S. and Kakde, O.G., "C & Data Structures," Charles River Media: 217-221 [no date available].

Daciuk, J. "Experiments with Automata Compression," Database Inspec [online] The Institution of Electrical Engineers, GB (2000) and Proceedings of Fifth International Conference on Implementation and Application of Automata: 113-119 (Jul. 24, 2000-Jul. 25, 2000).

Anonymous, Graph (data structure) [online] Oct. 2007 [retrieved on Oct. 3, 2007] Retrieved from the Internet URL: http://en.wikipedia.org/w/index.php?title=graph_(data structure) &o...

Vahid, F., "The Softening of Hardware," Computer, 36(4): 27-34 (Apr. 2003).

McConnell, S., "Who Needs Software Engineering?" IEEE Software, 18(1): 5-8 (Jan.-Feb. 2001).

Tewari, et al., A Parallel DFA Minimization Algorithm, S. Sahni, et al. (Eds.) HiPC 2002, LNCS 2552, pp. 31-40, 2002.

Ciura, et al., Software-Practice and Experience, 31:1007-1090, 2001.

Dharmapurikar, et al., "Design and Implementation of a String Matching System for Network Intrusion Detection using FPGA-based Bloom Filters," Washington University Dept. of Computer Science and Engineering: Technical Report WUCS-2004-012 (2004).

Ramakrishnan, et al., Proceedings of the 2006 Conference on Emperical Methods in Natural Language Processing (EMNLP 2006), pp. 492-500, Sydney, Jul. 2006).

Tanenbaum, A., "Structured computer organization" (2nd ed.), Prentice-Hall, Inc., Upper Saddle River, NJ (1984).

International Preliminary Report on Patentability and Written Opinion, PCT/US2008/011545, mailed Jun. 10, 2010.

Office Action mailed on May 25, 2010 for U.S. Appl. No. 11/982,433.

International Preliminary Report on Patentability and Written Opinion for PCT/US2008/011543, mailed Jun. 10, 2010.

European Examination Report for European Application No. 05812863.8, mailed May 14, 2008.

Alicherry et al., "High Speed Pattern Matching for Network IDS/IPS," IEEE, pp. 187-196, 2006.

Candan et al., "Afilter: Adaptable XML Filtering with Prefix-Caching and Suffix-Caching," VLDB '06 Sep. 12-15, 2006, Seoul, Korea, pp. 559-570.

Final Office Action, Dated: Dec. 2, 2010 for U.S. Appl. No. 11/982,433.

Du, A., et al., "Comparison of Stringmatching Algorithms: An Aid to Information Content Security," *Machine Learning and Cybernetics, 2003 International Conference*, 5:2-5 pp. 2996-3001 (Nov. 2003).

Ehtesham Rafig, A.N.M., "A Fast String Search Algorithm for Deep Packet Classification," *Computer Communications*, 27, pp. 1524-1538 (Sep. 2004).

(56) References Cited

OTHER PUBLICATIONS

Fisk, M. and Varghese, G., "Fast Content-Based Packet Handling for Intrusion Detection," UCSD Technical Report, pp. 1-14 (May 2001).
Yu, R., et al., "Gigabit Rate Packet Pattern-Matching Using TCAM," in ICNP, 10 pgs. (2004).
Final Office Action, dated Jun. 28, 2013 for U.S. Appl. No. 11/982,433.

* cited by examiner

| node:: | commands | arcs | |
|---|---|---|---|
| 0:: | Clear(all);Done;<br>C; | 1->1, 3-2, a->3, x->4 | 802 |
| 1::<br>{i0t-1e3o1d1s0: "1,2[^y]*3"} | 2->5 | | 804 |
| 2::<br>{i0t0e3o8d1s8: "12[^y]*3,"} | AddIfBreak(0,1);Output(0,3);Done;<br>i0(1);o0(3); | | 806 |
| 3::<br>{i0t-1e1o1d1s0: "a,bc"} | b->6 | | 808 |
| 4::<br>{i0t0e2o1d1s0: "x,[abc]*y"} | Clear(0);Add(0,0);Done<br>c0;a0(0); | a->7, bc->8, y->9 | 810 |
| 5::<br>{i0t-1e3o2d2s0: "12,[^y]*3"} | FixedSet(1,1);Done;<br>F(1,1); | | 812 |
| 6::<br>{i0t-1e1o2d2s0: "ab,c"} | c->10 | | 814 |
| 7::<br>{i0t-1e1o1d1s0: "a,bc"}<br>{i1t0e2o1d1s0: "x,[abc]*y"}<br>{i2t0e2o7d255s18: "x[abc]*,y"} | | a->7, b->11, c->8, y->9 | 816 |
| 8::<br>{i0t0e2o1d1s0: "x[abc]*,y"}<br>{i1t0e2o7d255s18: "x[abc]*,y"} | | a->7, bc->8, y->9 | 818 |
| 9::<br>{i0t0e2o8d255s16: "x[abc]*,y"} | Output(0,2);Done;<br>o0(2); | | 820 |
| 10::<br>{i0t-1e1o3d3s0: "abc,"} | FixedOutput(1,2);Done;<br>f(1,2); | | 822 |
| 11::<br>{i0t-1e1o2d2s0: "ab,c"}<br>{i1t0e2o1d1s0: "x,[abc]*y"}<br>{i2t0e2o7d255s18: "x[abc]*,y"} | | a->7, b->8, c->12, y->9 | 824 |
| 12::<br>{i0t-1e1o3d3s0: "abc,"}<br>{i1t0e2o1d1s0: "x,[abc]*y"}<br>{i2t0e2o7d255s18: "x[abc]*,y"} | FixedOutput(1,2);Done;<br>f(1,2); | a->7, bc->8, y->9 | 826 |

FIG. 8

```
Offset  data  node {commands}       operations:
0:      1 (   1)
1:      2 (   5) {F(1,1);}      <set1,1(pending0)>
                                <add kill: break_class=1, brk=1><set1=0>
2:      _ (z<C>0) {C;}          <C>
3:      a (   3)
4:      b (   6)
5:      c (  10) {f(1,2);}      <*f(1):3..5*>
6:      _ (z<C>0) {C;}          <C>
7:      3 (   2) {i0(1);o0(3);} <if1,a0><i=>a0=0,-1><o0(3)=0,7>
8:      \n (z                   <C><*t0:0..7*>
           0) {C;}              <C>
9:      1 (   1)
10:     2 (   5) {F(1,1);}      <set1,1(pending9)> <set1=0>
11:     _ (z<C>0) {C;}          <C>
12:     x (   4) {c0;a0(0);}    <c0><a0=12,-1>
13:     a (   7)
14:     a (   7)
15:     a (   7)
16:     a (   7)
17:     b (  11)
18:     b (   8)
19:     b (   8)
20:     b (   8)
21:     c (   8)
22:     c (   8)
23:     c (   8)
24:     c (   8)
25:     y (   9) {o0(2);}       <o0(2)=12,25>
                                <checking kill: graph=0200000000000002,
                                    active=0000000000000002>
                                {kill} <kill: break=1>
26:     _ (z<C>                 <*t0:12..25*>
           0) {C;}              <C>
27:     3 (   2) {i0(1);o0(3);} <if1,a0><o0(3)=-1,27><killed thread 0>
28:     \n (z<C>0) {C;}         <C>{flush due to EOF}<C>
```

FIG. 9

```
           ::matched expr's::
       Expression 1: abc
       Expression 2: x[abc]*y
       Expression 3: 12[^y]*3
       ::   report   ::
1000 ─{ Match of Exp   1: {  3.. 5} "{abc}"
       Match of Exp   3: {  0.. 7} "{12_abc_3}"
       Match of Exp   2: { 12.. 25} "{xaaaabbbbccccy}"
```

FIG. 10

CONTENT SEARCH MECHANISM THAT USES A DETERMINISTIC FINITE AUTOMATA (DFA) GRAPH, A DFA STATE MACHINE, AND A WALKER PROCESS

RELATED APPLICATIONS

This application claims the benefit of U.S. Provisional Application Nos. 60/609,211 filed on Sep. 10, 2004 and 60/669,583, filed on Apr. 8, 2005. The entire teachings of the above application are incorporated herein by reference.

BACKGROUND OF THE INVENTION

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of characters. The simplest pattern matched by a regular expression is a single character or string of characters, for example, 'c' or 'cat'. The regular expression also includes operators and meta-characters that have a special meaning.

Through the use of meta-characters, the regular expression can be used for more complicated searches such as, 'abc.*xyz'. That is, find the string 'abc', followed by the string 'xyz', with an unlimited number of characters in-between 'abc' and 'xyz'. Another example is the regular expression 'abc..abc.*xyz'; that is, find the string 'abc', followed two characters later by the string 'abc' and an unlimited number of characters later by the string 'xyz'.

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed 100 characters later by another particular text string.

Some IDS applications generate lots of false positives, that is, the applications detect an attack when there is none. Others miss attacks because simple pattern matching of signatures is often insufficient and the application cannot handle the amount of data to be analyzed.

Content searching is typically performed using a search algorithm such as, Deterministic Finite Automata (DFA) to process the regular expression. The DFA processes an input stream of characters sequentially using a DFA graph and makes a state transition based on the current character and state. The greater the number of wildcard characters in the regular expression, the more unmanageable the DFA graph becomes.

SUMMARY OF THE INVENTION

Regular expression matching combines different operators and single characters allowing complex expressions to be constructed. Also, the pattern that is being searched may be repeated a variable number of times, in a data stream. There are limitations when using a DFA search algorithm, such as, false matches in a data stream with repeated patterns and exponential growth of the size of the DFA graph used to perform the search. Additionally, it is hard to hard to handle the '*' operator in a regular expression because DFA does not return a start offset, that is, the position of the start of the match for the regular expression in the data stream. In contrast, DFA returns a list of matches with the corresponding end offset, that is, the position of the end of the match for the regular expression in the input string, and thus requires post processing of the results.

Due to these limitations, content processing applications require a significant amount of post processing of the results generated by pattern search. Post processing requires qualifying the matched pattern with other connection state information such as type of connection, and certain values in a protocol header included in a packet. It also requires certain other types of compute intensive qualifications, for example, a pattern match may be valid only if it is within a certain position range within a data stream, or if it is followed by another pattern and within certain range from the previous pattern or after/at a specific offset from the previous pattern.

To avoid the overhead of post processing and improve the overall performance of content processing application, the present approach provides an improved content search mechanism. A graph having intelligent nodes is generated. An intelligent node is a node in a DFA graph that includes a command according to the principles of the present invention. The command in the intelligent node allows additional state information to be generated and checked.

A network services processor includes a processor and memory. The memory stores a graph having a plurality of nodes. Each node has an associated state. The processor executes a walker process to walk the graph to search for a match defined by a regular expression in an input stream. At least one node in the graph is associated with a command. Upon reaching the at least one node, the processor executes the command to manage the state for the corresponding node.

The command may be specified by the node in the graph or an arc to the node in the graph. The command allows the processor to traverse a same node with different interpretations. The walker may be stored in a second memory accessible to the processor. The graph may be stored in a low-latency memory directly accessible by the processor. The state information may include start offset, end offset, and depth into an expression.

A content search mechanism includes a compiler and a walker process. The compiler generates a graph having a plurality of intelligent nodes. The walker process executes a command associated with one of the intelligent nodes to manage a state associated with the intelligent node while walking the graph stored in a memory to search for a match in an input stream based on a sequence of characters defined by an expression.

A network services processor includes a memory storing a graph having a plurality of intelligent nodes and associated state information. The processor also includes a content search mechanism. The content search mechanism includes a walker that walks the intelligent nodes in the graph to search for a match in an input stream by executing a command stored in one of the intelligent nodes and/or another memory (e.g., DRAM 108) to manage the state. A network services processor may also include a compiler that generates the graph.

A deterministic finite automata-based graph includes at least one data node that stores a command. The command is executed while walking the graph to search for a match for a sequence of characters defined by a regular expression in an input stream. The graph also includes a state for storing status of a data node while walking the graph, the state including start offset, end offset and depth into an expression.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 illustrates the format of the node descriptors for nodes in the graph shown in FIG. 6;

FIG. 9 illustrates the operation of the walker process using the graph shown in FIG. 6 to search for matches for expressions in an input stream;

FIG. 10 illustrates a report of matches in the input stream;

DETAILED DESCRIPTION OF THE INVENTION

A description of preferred embodiments of the invention follows.

Figure 1:
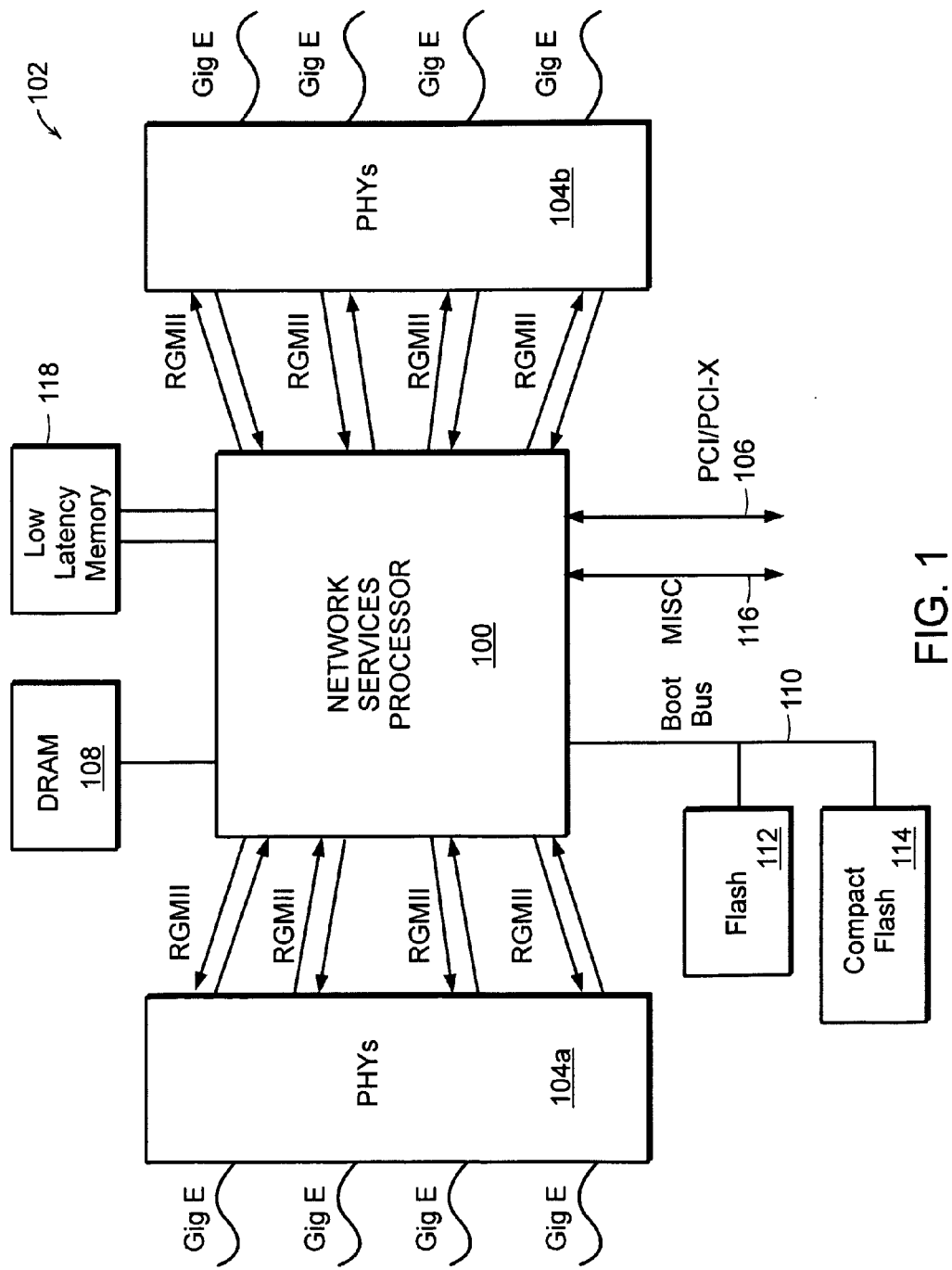
FIG. 1 is a block diagram of a security appliance including a network services processor according to the principles of the present invention.

FIG. 1 is a block diagram of a security appliance 102 including a network services processor 100 according to the principles of the present invention. The security appliance 102 is a standalone system that can switch packets received at one Ethernet port (Gig E) to another Ethernet port (Gig E) and perform a plurality of security functions on received packets prior to forwarding the packets. For example, the security appliance 102 can be used to perform security processing on packets received on a Wide Area Network prior to forwarding the processed packets to a Local Area Network.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 schedules and queues work (packet processing operations) for upper level network protocols, for example, L4-L7 and allows processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 includes a plurality of Ethernet Media Access Control interfaces with standard Reduced Gigabit Media Independent Interface (RGMII) connections to the off-chip physical interfaces PHYs 104a, 104b.

The network services processor 100 receives packets from the Ethernet ports (Gig E) through the physical interfaces PHY 104a, 104b, performs L7-L2 network protocol processing on the received packets and forwards processed packets through the physical interfaces PHYs 104a, 104b to another hop in the network or the final destination or through the PCI bus 106 for further processing by a host processor. The network protocol processing can include processing of network security protocols such as Firewall, Application Firewall, Virtual Private Network (VPN) including IP Security (IPSec) and/or Secure Sockets Layer (SSL), Intrusion detection System (IDS) and Anti-virus (AV).

The network services processor 100 includes a low-latency memory controller for controlling low-latency Dynamic Random Access Memory (DRAM) 118. The low-latency DRAM 118 is used for Internet Services and Security applications allowing fast lookups, including the string-matching that may be required for Intrusion Detection System (IDS) or Anti Virus (AV) applications and other applications that require string matching.

The network services processor 100 performs pattern search, regular expression processing, content validation, transformation and security accelerate packet processing according to the principles of the present invention. The regular expression processing and pattern search is used to perform string matching for AV and IDS applications and other applications that require string matching.

A DRAM controller in the network services processor 100 controls access to an external Dynamic Random Access Memory (DRAM) 108 that is coupled to the network services processor 100. The DRAM 108 stores data packets received from the physical interfaces PHYs 104a, 104b or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 800 MHz.

A boot bus 110 provides the necessary boot code which is stored in flash memory 112 and is executed by the network services processor 100 when the network services processor 100 is powered-on or reset. Application code can also be loaded into the network services processor 100 over the boot bus 110, from a device 114 implementing the Compact Flash standard, or from another high-volume device, which can be a disk, attached via the PCI bus.

The miscellaneous I/O interface 116 offers auxiliary interfaces such as General Purpose Input/Output (GPIO), Flash, IEEE 802 two-wire Management Interface (MDIO), Universal Asynchronous Receiver-Transmitters (UARTs) and serial interfaces.

Figure 2:
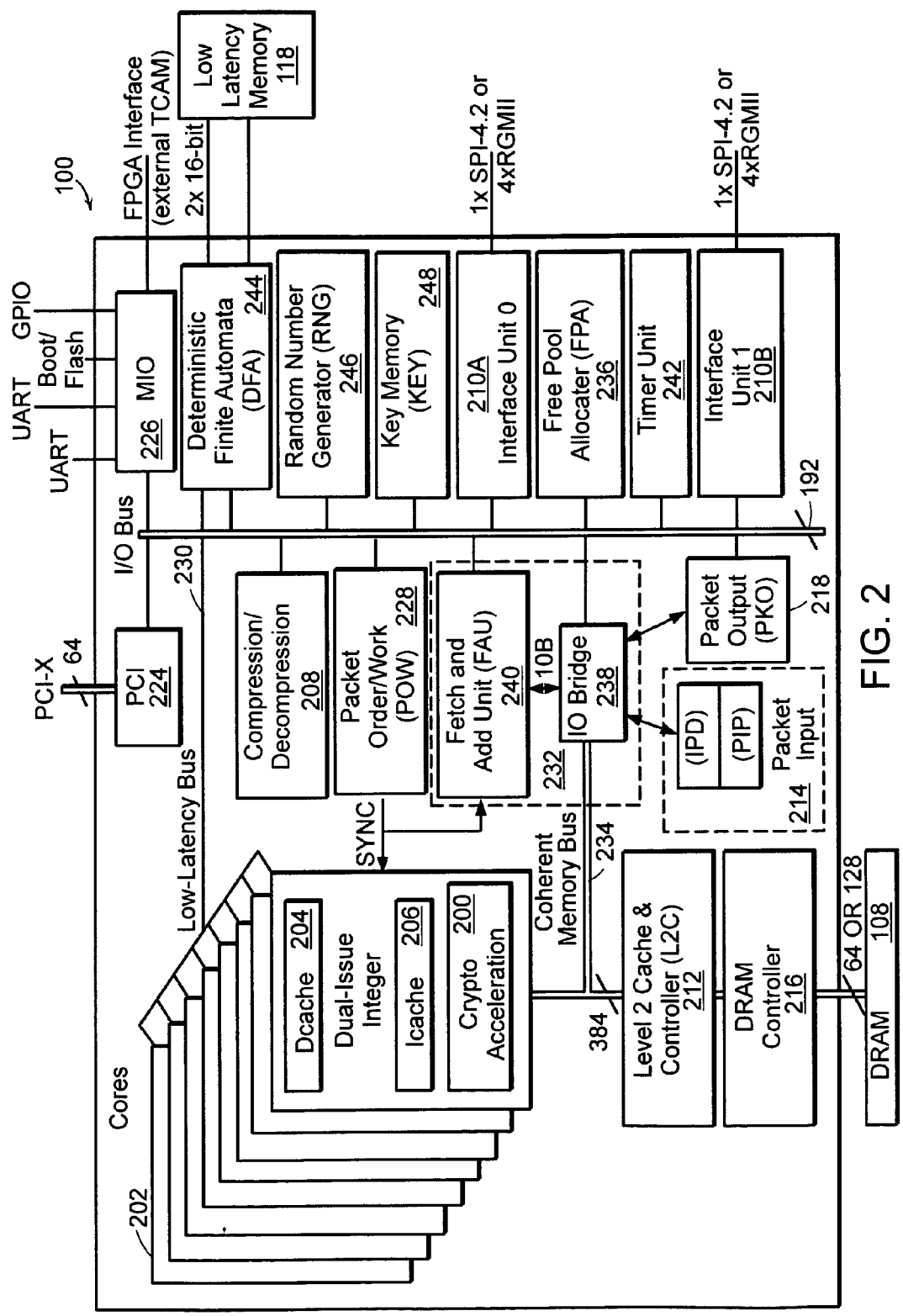
FIG. 2 is a block diagram of the network services processor shown in FIG. 1.

FIG. 2 illustrates a block diagram of the network services processor 100 shown in FIG. 1. The network services processor 100 delivers high application performance using a plurality of processors (cores) 202. Network applications can be categorized into data plane and control plane operations. Each of the cores 202 can be dedicated to performing data plane or control plane operations. A data plane operation includes packet operations for forwarding packets. A control plane operation includes processing of portions of complex higher level protocols such as Internet Protocol Security (IPSec), Transmission Control Protocol (TCP) and Secure Sockets Layer (SSL). A data plane operation can include processing of other portions of these complex higher level protocols.

A packet is received by any one of the interface units 210a, 210b through a SPI-4.2 or RGM II interface. A packet can also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 performs pre-processing of L3 and L4 network protocol headers included in the received packet. The pre-processing includes checksum checks for Transmission Control Protocol (TCP)/User Datagram Protocol (UDP) (L3 network protocols).

The packet input unit 214 writes packet data into buffers in Level 2 cache 212 or DRAM 108 in a format that is convenient to higher-layer software executed in at least one processor 202 for further processing of higher level network protocols. The packet input unit 214 supports a programmable buffer size and can distribute packet data across multiple buffers to support large packet input sizes.

The Packet order/work (POW) module (unit) 228 queues and schedules work (packet processing operations) for the processor 202. Work is defined to be any task to be performed by a processor that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a processor on the received packet stored in memory (L2 cache memory 212 or DRAM 108). For example, the work can be the processing of a received Firewall/Virtual Private Network (VPN) packet. The processing of a Firewall/VPN packet includes the following separate packet processing operations (pieces of work): (1) defragmentation to reorder fragments in the received packet; (2) IPSec decryption (3) IPSec encryption; and (4) Network Address Translation (NAT) or TCP sequence number adjustment prior to forwarding the packet.

The network services processor 100 also includes a memory subsystem. The memory subsystem includes level 1 data cache memory 204 in each processor 202, instruction cache in each processor 202, level 2 cache memory 212, a DRAM controller 216 for external DRAM memory and the interface 230 to external low-latency memory 118. The memory subsystem is architected for multi-processor support and tuned to deliver both high-throughput and low-latency required by memory intensive content networking applications. Level 2 cache memory 212 and external DRAM memory 108 (FIG. 1) is shared by all of the processors 202 and I/O co-processor devices.

The network services processor 100 also includes application specific co-processors that offload the processors 202 so that the network services processor achieves high-throughput. The application specific co-processors include a DFA co-processor 244 that performs Deterministic Finite Automata (DFA) and a compression/decompression co-processor 208 that performs compression and decompression.

Each processor 202 is a dual-issue, superscalar processor with instruction cache 206, Level 1 data cache 204, built-in hardware acceleration (crypto acceleration module) 200 for cryptography algorithms with direct access to low-latency memory over the low-latency memory bus 230. The low-latency direct-access path to low-latency memory 118 bypasses the L2 cache memory 212 and can be directly accessed from both the processors (cores) 202 and a DFA co-processor 244. In one embodiment, the latency to access the low-latency memory is less than 40 milliseconds.

Prior to describing the operation of the content search macros used for regular expression processing and pattern search in further detail, the other modules in the network services processor 100 will be described. After the packet has been processed by the processors 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

Each processor 202 is coupled to the L2 cache by a coherent memory bus 234. The coherent memory bus 234 is the communication channel for all memory and I/O transactions between the processors 202, an I/O Bridge (IOB) 232 and the Level 2 cache and controller 212.

A Free Pool Allocator (FPA) 236 maintains pools of pointers to free memory in level 2 cache memory 212 and DRAM 108. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM 108 using freed memory in the pool of pointers to store additional pointers.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the processors 202 and the packet output unit 218. The registers store highly-used values and thus reduce traffic to access these values. Registers in the FAU 240 are used to maintain lengths of the output queues that are used for forwarding processed packets through the packet output unit 218.

The PCI interface controller 224 has a DMA engine that allows the processors 202 to move data asynchronously between local memory in the network services processor and remote (PCI) memory in both directions.

Typically, content aware application processing utilizes a deterministic finite Automata (DFA) to recognize a pattern in the content of a received packet. The DFA is a finite state machine, that is, a model of computation including a set of states, a start state, an input alphabet (set of all possible symbols) and a transition function that maps input symbols and current states to a next state. Computation begins in the start state and changes to new states dependent on the transition function. The DFA is deterministic, that is, the behavior can be completely predicted from the input. The pattern is a finite number of strings of characters (symbols) to search for in the input stream (string of characters).

The pattern is commonly expressed using a regular expression that includes atomic elements, for example, normal text characters such as, A-Z, 0-9 and meta-characters such as, *, ˆ and |. The atomic elements of a regular expression are the symbols (single characters) to be matched. Concatenation is expressed by placing characters next to each other (e.g., 'ab'). These are combined with meta-characters that allow alternation (|) and Kleene-star (*). The meta-character for concatenation is used to create multiple character matching patterns from a single character (or sub-strings) while the meta-character for alternation (|) is used to create a regular expression that can match any of two or more sub-strings. The meta-character Kleene-star (*) allows a pattern to match any number, including no occurrences of the preceding character or string of characters. Combining different operators and single characters allows complex expressions to be constructed. For example, the expression (th(is|at)*) will match the following character strings: 'th', 'this', 'that', 'thisis', 'thisat', 'thatis', or 'thatat', etc.

The character class construct [ . . . ] allows listing of a list of characters to search for. For example gr[ea]y looks for both 'grey' and 'gray'. A dash indicates a range of characters, for example, [A-Z]. The meta-character '.' matches any one character.

The input to the DFA state machine is a string of (8-bit) bytes, that is, the alphabet is a single byte (one character or symbol). Each byte in the input stream results in a transition from one state to another state.

The states and the transition functions can be represented by a graph, where each node in the graph represents a state and arcs in the graph represent state transitions. The current state of the state machine is represented by a node identifier that selects a particular graph node. The graph is stored in low-latency memory 118 and accessed by the processors 202 over the low-latency bus. The graph will be described later in conjunction with FIG. 6.

The processors 202 access a DFA-based graph stored in the low-latency memory 118 directly. Each node in the DFA-based graph includes intelligent node support for "on-the-fly" graph-walk instructions. The content search macros handle {.*} and { . . . } expressions without graph size explosion, provide start offset for the matched pattern, support calling user functions after reaching a specific node, and provide support for packet or stream modification. Through the use of an intelligent node, qualified pattern and regular expression searches are performed. As the results are qualified by connection state and offset in the data-stream and distance and range from the previous search, there is no need for post processing.

Figure 3:
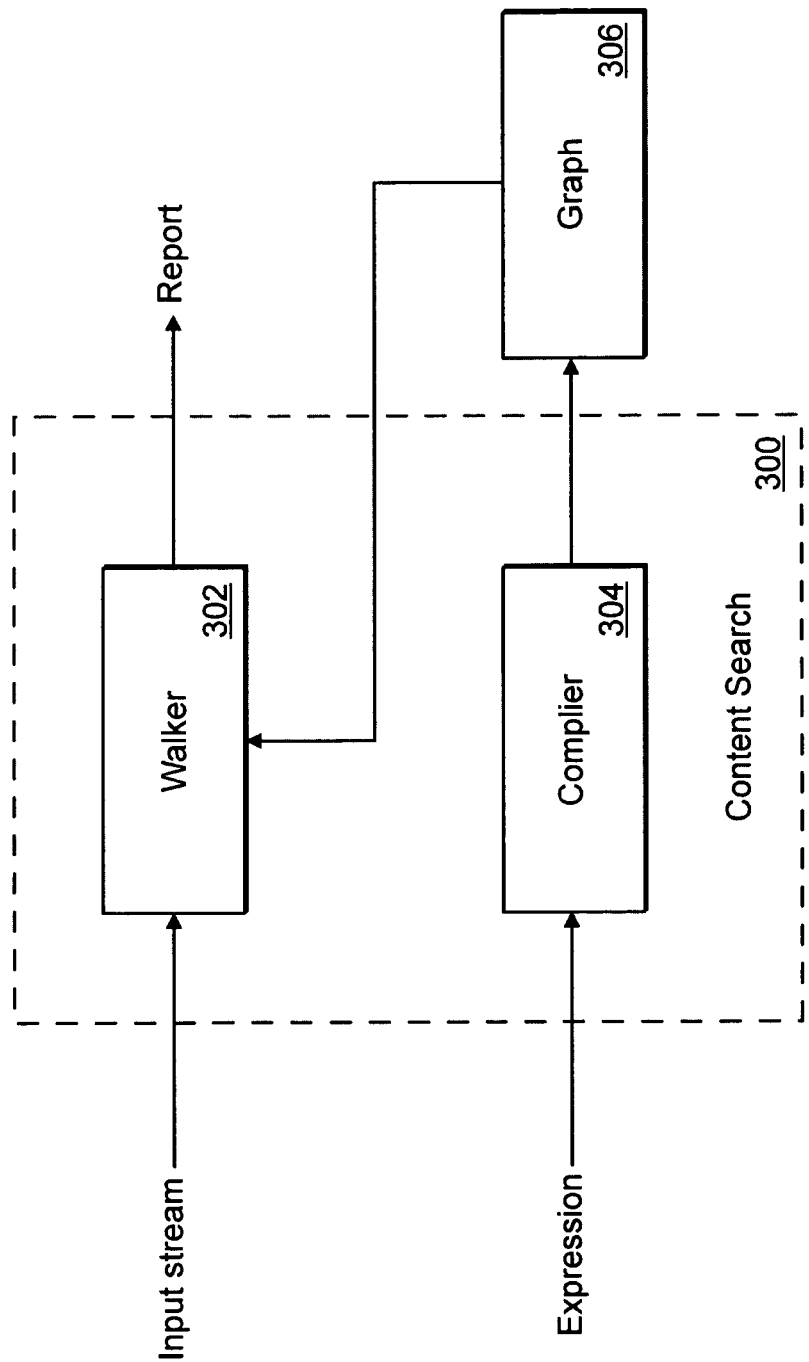
FIG. 3 is a block diagram illustrating content search macros used by a core in the network services processor.

FIG. 3 is a block diagram illustrating content search macros used by a processor 202 in the network services processor 100 shown in FIG. 2. Content search macros 300 include a compiler software component 304 for generating a DFA-based content search graph and a walker software component (process) 302 for searching the DFA-based content search graph. The content search macros 300 are stored in L2/DRAM (212, 108) and executed by a processor 202. The DFA-based content search graph 306 is stored in low-latency memory 118, which is accessible directly by the processor 202 through the low-latency bus and low-latency memory controller shown in FIG. 2. (Actually, the DFA graph is compiled by the compiler 302, resulting in an image file, which is stored in low-latency memory 118.) The compiler 304 translates expressions into a DFA-based content search graph 306 with intelligent nodes. The intelligent nodes will be discussed in conjunction with FIG. 4. After the compiler 304 has generated the content search graph and the graph is stored in low-latency memory 118, the walker process 302 executed by one of the processors 202 walks input data (string of characters) in the received data packet one character at a time and outputs a set of matches based on a search for a pattern in the input data using the content search graph.

The data structure 400 includes a number (e.g., N) intelligent nodes. Each node in the graph is an array of 256 Next Node Pointers, one for each unique input byte value; that is, $2^8$ (256 possible values). Each Next Node Pointer contains a Next Node ID that directly specifies the next node/state for the input byte value.

Figure 4:
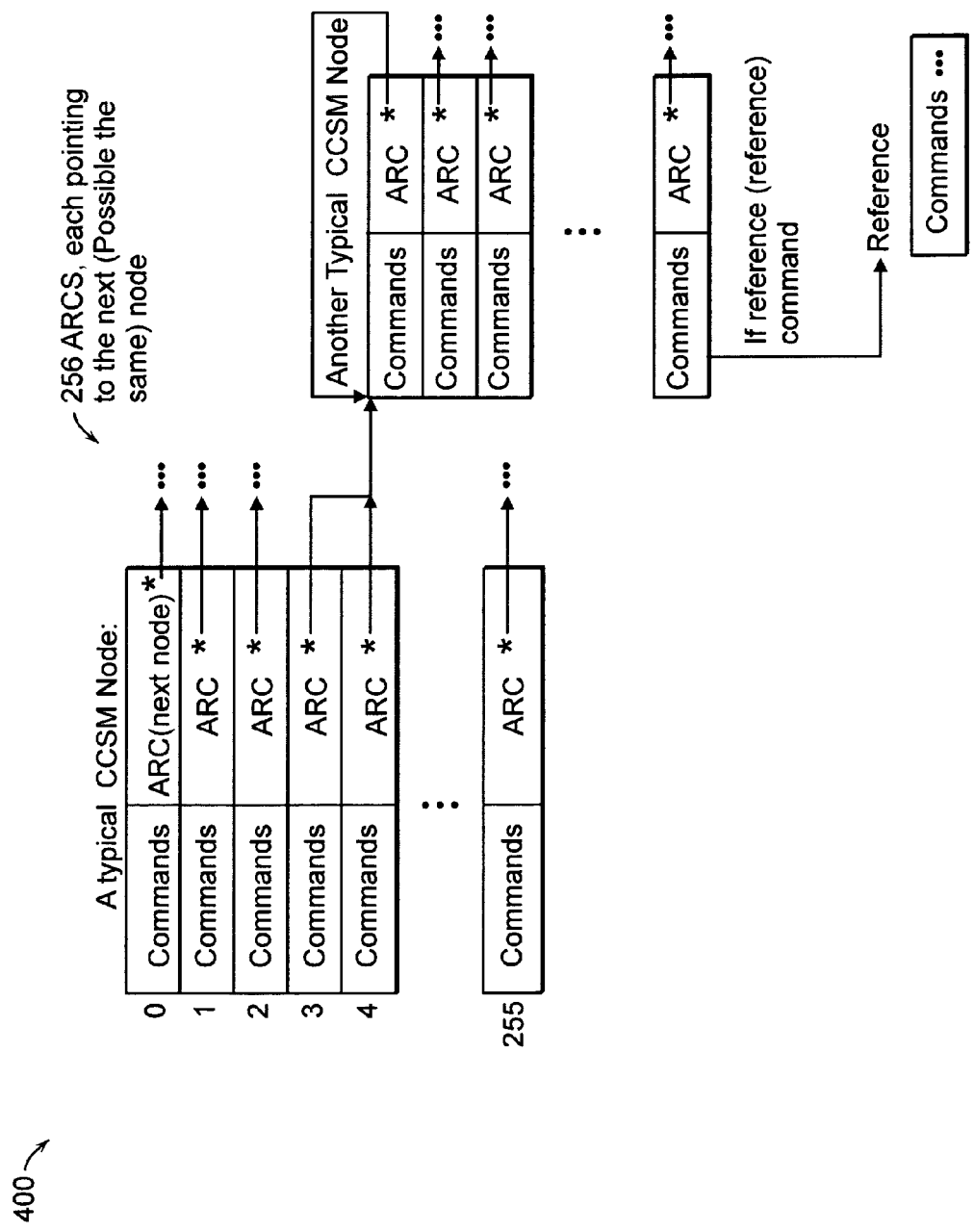
FIG. 4 is block diagram of an exemplary data structure stored in low-latency memory, random access memory and usable by the content search mechanism executing in a core to traverse a graph.

FIG. 4 is a block diagram of an exemplary data structure 400. This data structure 400 is compiled into an image file that is stored in Low-Latency Memory Random Access Memory 118 (FIG. 2) and used by the content search mechanism executing in a processor 202 to traverse a graph. The data structure 400 also includes one or more intelligent nodes that can be used in a content search graph according to the principles of the present invention.

Figure 6:
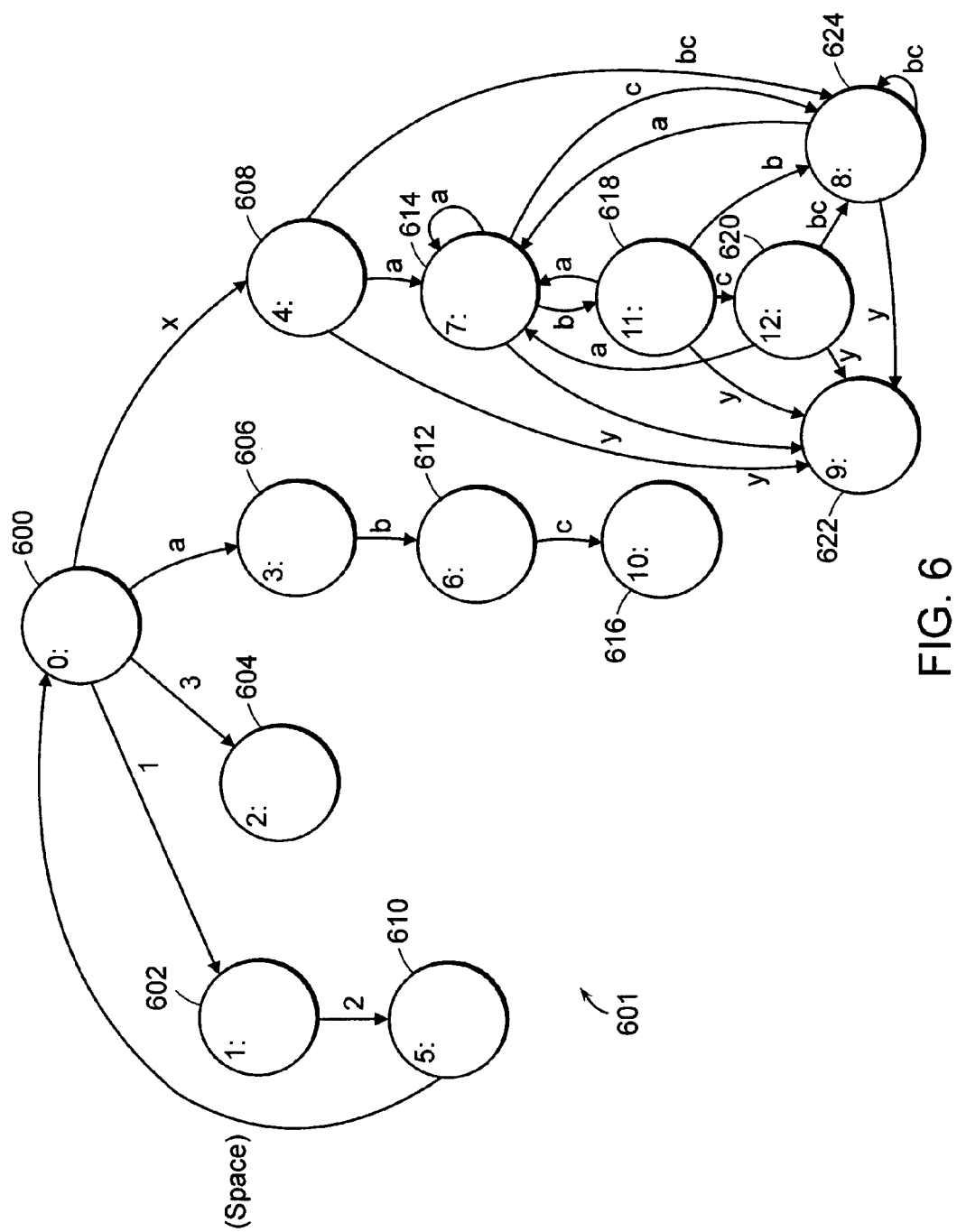
FIG. 6 illustrates the graph created by the compiler for searching an input stream for a match for a plurality of expressions.

An exemplary graph incorporating intelligent nodes illustrated in FIG. 6. The walker 302 in the content search mechanism starts the search by providing a pointer to the start of the graph, the starting node ID, and the input stream. The walker 302 in the content search mechanism traverses the nodes in the graph based on the input stream.

The graph is either 36-bit mode, that is, with a 36-bit next node pointers or 18-bit mode, that is, with 18-bit next node pointers stored in LLM DRAM. In 36-bit node the node type (normal, terminal or marked) is determined directly from the type field in the Next Node Pointer. In fact, individual transitions, not just individual nodes, can be marked in 36-bit mode.

In addition to what is stored at a traditional DFA node in the graph, when generating the graph, the compiler 304 can store commands at nodes in the graph. These commands allow additional state to be generated and checked in addition to the traditional DFA state of "current node." This additional state which is referred to as break-based or thread-based state allows the walker 302 to traverse the same node with two different interpretations. By allowing different interpretations for the same node, the graph size does not become exponential.

Also, the offset of the input data can be remembered at various points, so that start offsets can be returned. Furthermore, additional qualifiers, such as "only allow this match within a certain offset range," can be used to place restrictions on the reported matches. The commands allow the walker 302 also referred to as the Automaton to call a user function upon reaching a node, which can perform any desired user tasks, including modifying the input data or position. By using the "intelligent node" structure, the walker 302 can perform tasks "just-in-time" rather than requiring either a large graph size or a large amount of post-processing, while maintaining the benefits of a traditional DFA structure.

The graph representation has various forms which allow different performance, features, memory and size tradeoffs to be made, but the basic graph structure is a set of intelligent nodes, each of which contains information on which node to visit next and optionally which commands to execute for each character of input in the input data (string of characters), which is walked one character at a time. Upon reaching a particular node, the function specified by the command associated with the node is performed and processing continues with the next node dependent on the next character in the input stream. In one embodiment, each character in the alphabet (character set) is 8-bits (one byte). However, the alphabet is not limited to 8-bit characters.

When generating the graph, commands are stored by the compiler 304 either directly in the intelligent graph nodes, or a reference is stored in the intelligent graph nodes which specifies another location at which the commands are stored. The content search mechanism supports commands that are packed as a stream of instructions representing commands that are to be interpreted by the walker 302, or they can be compiled into processor-native binaries that can be directly executed by the processor 202 as a subroutine in the walker 302, or a combination of both.

Figure 5:
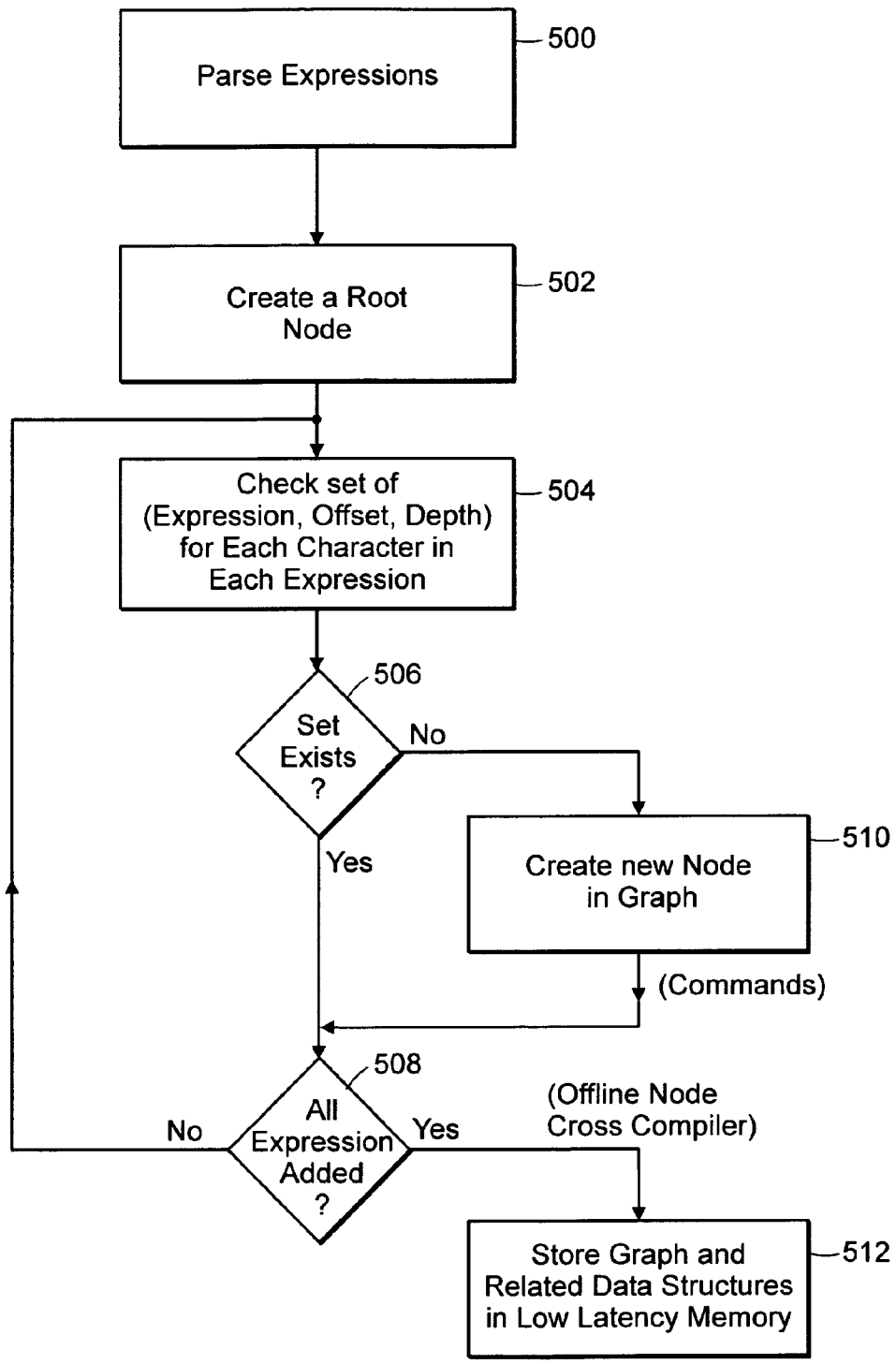
FIG. 5 is a flowchart illustrating a method for creating a graph with intelligent nodes implemented in the compiler shown in FIG. 3.

FIG. 5 is a flowchart illustrating a method for creating a graph with intelligent nodes implemented in the compiler 304 shown in FIG. 3. An embodiment of an exemplary graph 601 created by the compiler 302 is shown in FIG. 6.

A node in a graph can be described as a set of "positions" which represent which part of an expression can occur next. For the intelligent node, created by the compiler 304, the "positions" include a number assigned to the expression, the offset into the expression, and the depth. The depth is the number of characters that have been traversed from the root node of the graph. The thread assigned to this position and some thread information is also stored for each node. The "positions" will be described later in conjunction with FIG. 8.

At step 500, the compiler 304 first parses regular expressions describing patterns in a string of characters to check basic expression syntax and to create information about nesting structure and minimum match offset. While parsing, the compiler 304 also determines where to insert breaks in the graph. The compiler 304 will be described for creating a graph with intelligent nodes for searching for matches for the regular expressions: abc, x[abc]*y and 12[^y]*3. FIG. 6 illustrates the graph 601 constructed by the compiler 304 for searching input data for a match for these expressions; although, some arcs are not shown. The flowchart of FIG. 5 will be described in conjunction with FIG. 6.

The expression 'abc' looks for an exact match for the string of characters abc in the input data (string of characters). This expression is a fixed-length expression, that is, the number of nodes (3) and thus the depth of the graph is known (fixed). The expression x[abc]*y, looks for the character 'x' followed by any of the characters 'a', 'b', or 'c' in the character class [ . . . ] and then looks for the character y an unlimited number of characters later in the input data. The expression 12[^y]*3 looks for the string of characters '12' followed by any character other than 'y' and then for the character '3', an unlimited number of characters later in the input data. The expressions x[abc]*y and 12[^y]*3 are not fixed, and thus the depth is unknown. The expressions x[abc]*y and 12[^y]*3 are non-fixed length because they each look for a variable number of characters, since they include meta-characters.

After all of the expressions have been parsed, at step 502, the compiler 304 creates a root Node 600 (FIG. 6) and nodes are added to the graph for one expression at a time to determine all outgoing arcs for the nodes. In a typical DFA compiler the outgoing arcs from a node are represented as a set of (expression, offset (or position)) pairs. In the content search macros compiler 304, the outgoing arcs from the nodes include the additional state of "depth." Depth represents the number of characters into the expression, and can either be a known amount or can be a value representing "unknown depth."

Next, the graph is built. First there is one node (root node-Node 0) 600 that has a position for each expression at offset 0. Then 256 lists are created for this Node 600, one for each of the possible outgoing arcs. Each list is a set of positions. The lists are created for the root Node 600 by looking at each position and seeing what set of positions can happen next from that position. Once all outgoing lists are generated for the root Node 600, that is for '1', '3', 'a', and 'x', then for each list all of the existing nodes are checked to see if a node exists for that set of positions. This will not be true for any of the lists from the root Node 600 because only the root Node 600 exits.

In the case of the root node (Node 0) 600, 4 new Nodes 602, 604, 606, 608 are generated (labeled Nodes 1, 2, 3 and 4, respectively). Once all the lists have been satisfied either by creating new nodes or finding compatible nodes, the node's outgoing arcs are determined.

At step 504, for each character in the expressions, the sets of (expression, offset, depth) triples are compared against the existing sets of nodes. If at step 506, a set of triples does not exist, a new node is created at step 510 to represent the set. A new node is created and the positions from the list are recorded in that node. If commands are stored as one set per node, while comparing the potential nodes that could match a set, the compatibility of the commands is also be checked. Thus, an otherwise matching node may have to be skipped to use or create another node if the commands are not compatible.

The root Node 600 automatically has a Clear (all) command because the root Node 600 is reached when no current expressions are matching and for breaks. Other nodes have commands if the thread changes, if the expression matches, if a break is reached, or if a break is exited. The depth plays a crucial role in the command determination. While the depth remains known, no thread is needed. Once the depth becomes unknown, a thread is created to remember the start offset, based on a delta from the previously known depth resulting in an Add(thread,delta) command.

If a thread is already in use, and it is not the same in the current node as it is in the next node, a move (thread1, thread2) command is generated. If an expression that has a thread is no longer matching but does not go back to the root node, a Clear(thread) command is generated. When an offset is reached that is greater than the minimum offset required for a match as determined during the first parsing phase, the expression is checked to see if the rest of the expression is optional, and if it is, either a FixedOutput(expression, delta) command will be generated (if depth is known) or an Output (thread, expression) command will be generated (if a thread is being used).

The adding of outgoing arcs from nodes and new commands continues for each outgoing arc of the root Node 600, and then starts over again for each new node created. After Nodes 602, 604, 606, 608 have been generated and all outgoing arc lists generated, Node 602 is considered and all outgoing arc lists are generated. As the arc lists do not match any of the arc lists for existing Nodes 602, 604, 606, 608, a new node, Node 610 is created and then Node 604 is considered and the process continues until the 12$^{th}$ node when the outgoing arcs lists all match existing Nodes 614, 624, 622. The 12$^{th}$ node is not created and the graph is complete.

At step 508, if all expressions have been fully added, processing continues with step 512 where the content search macros graph and related data structures are output by the compiler 304 and stored as an image file. It is this image file that becomes the contents of the low-latency memory 118. Accordingly, it is possible to perform the compilation on another host processor, such as a personal computer, later transferring the image file to the low-latency memory 118.

The compiler 304 can store commands as part of the "body" of the node with one set of commands per node or as part of the arcs leading out of the node, with one set of commands per arc, or up to 256 sets of commands per node for an alphabet of 8-bit bytes. The choice is dependent on performance/memory considerations. It is desirable for the compiler not to store "back references" for the arcs during graph construction because there can be a large number of arcs terminating at a node.

If commands are stored per node, the graph requires more nodes because some otherwise identical nodes will have incompatible commands when arriving from different nodes. However, the nodes will be smaller, because there is only one common set of commands per node. Another consideration is that a more complex compiler is required for graph construction when there is one set of commands per node because the compiler needs to determine the compatibility of all commands associated with the node for each incoming arc to a node. It may be possible to save one memory de-reference if the commands or a reference to the commands are stored with each arc, rather than with each node.

In another embodiment, information about these requests is stored in data structures that are not part of the nodes. For example, a function can be registered per expression. The registered function is called when that expression matches. A function can be called in the middle of an expression by adding another expression that represents the first part of the original expression and a function can be registered to that new expression. The basic conditional checks are stored as part of a break data structure, or arbitrarily complicated checks can be provided by registering a function call that changes state. In some embodiments the function is a user function In contrast to a DFA graph, the content search mechanism stores additional state which is optionally modified by commands stored at the nodes. The additional state includes start and end offsets in the input stream and active kill lists. The memory required for storing state is generally known at compile-time. The state is divided into a thread-based state and a break-based state. The break-based state includes state for pending breaks, active breaks and constant breaks. As previously discussed, fixed expressions, that is, expressions whose depth can always be determined to the end do not need a thread-based state.

A thread-based state is stored for non-fixed expressions. Thread-based state is "local" to a particular node, or part of the graph and is constantly being added, cleared, moved, or re-used during graph walking. An add thread command is stored at a node to add thread state. For example, thread state is added at Node 4 upon detection of the first constant expression for character 'x' in the expression x[abc]*y. Example pseudo code for the add command is:

```
Add(thread,delta): // add a new thread starting at (data_offset-delta)
    if (walking_state[thread].start_offset != OFFSET_INVALID) {
        walking_state[thread].start_offset == data_offset-delta;
    }
```

The thread-based state stores valid start and end offsets for a match that occurs while walking the graph away from the root Node 600. When an expression includes something for which the start offset can no longer be determined, for example, if the expression includes something optional, for example '*', the start offset in the input string of characters is saved based on the non-optional part of the expression matched to that point. The end offset is saved when the end of the expression is met, and is copied to a report associated with the matched. The format of the report structure will be described later in conjunction with FIG. 11. The format of the thread-based state will be described later in conjunction with FIG. 12.

FIG. 6 illustrates a graph constructed by the compiler for searching an input stream of characters for matches for regular expressions abc, x[abc]*y and 12[^y]*3. In order to search for all three expressions in the input stream, the graph has 13 nodes labeled Nodes 0 through 12. The number of nodes in the graph is reduced from the 22 nodes in a graph produced by a traditional DFA compiler shown in FIG. 7A to a graph with 13 nodes by providing the ability to store commands at the nodes.

Figure 7A:
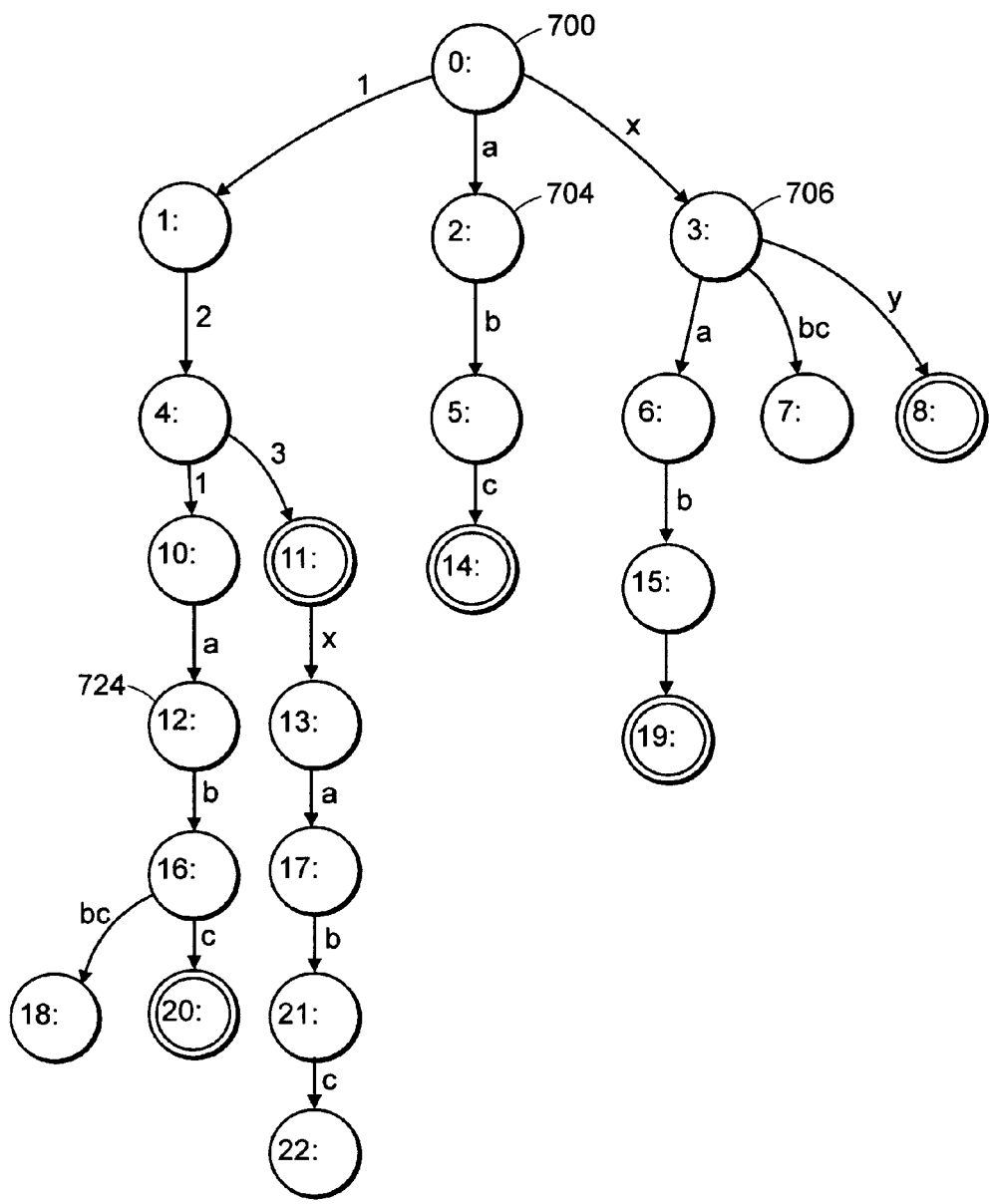
FIGS. 7A and 7B are exemplary DFA graphs with non-intelligent nodes.
Figure 7B:
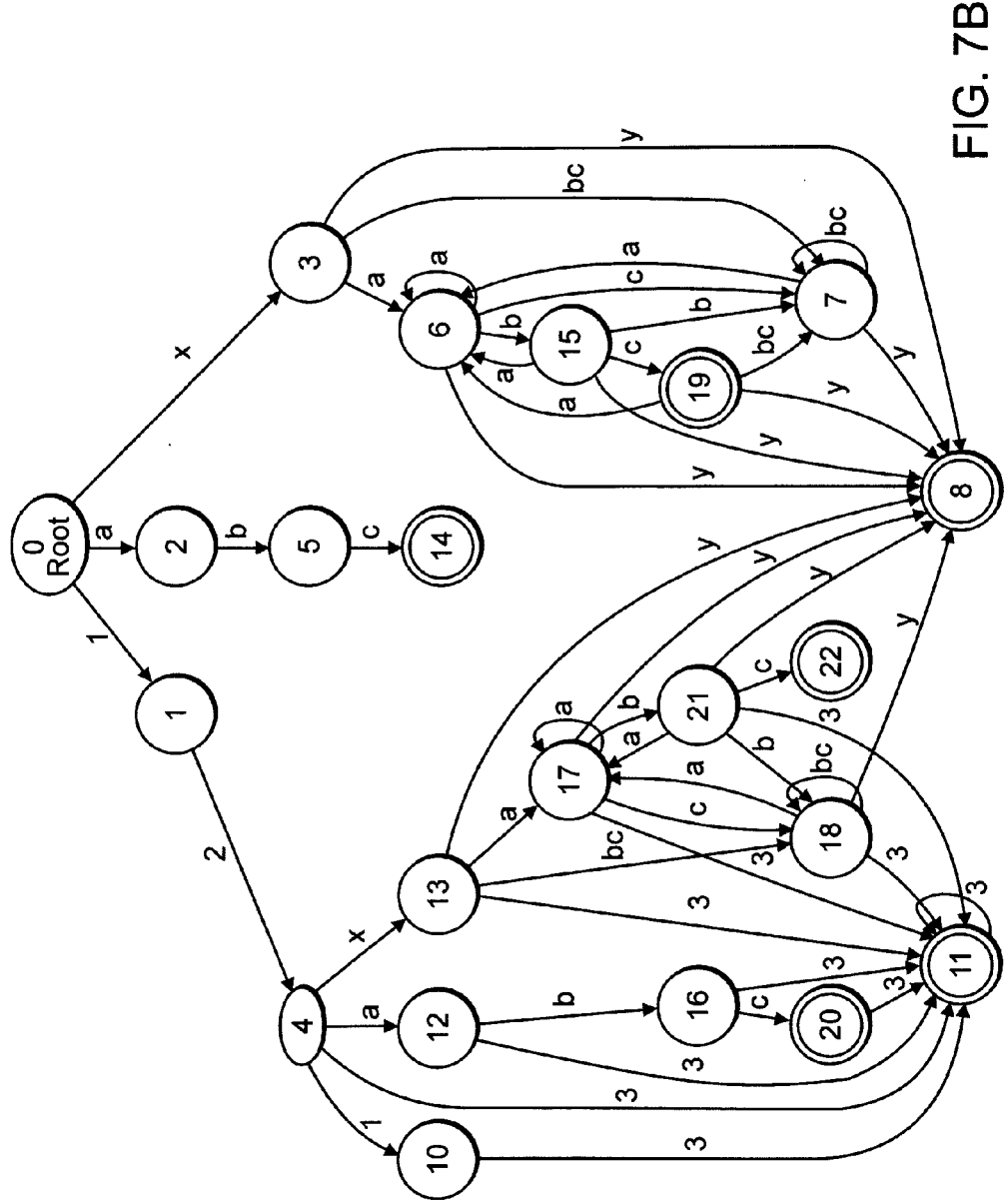

Referring to FIG. 7A, the traditional DFA compiler creates the graph with 22 nodes for searching for regular expressions abc, x[abc]*y and 12[^y]*3. All 22 nodes are shown in FIG. 7, but "back references" are not shown. The additional nodes are required because once the '12' is matched from expression 12[^y]*3, the nodes required to keep track of expressions abc and x[abc]*y need to be duplicated. For example node 724 labeled 12 is a "duplicate" of node 704 labeled 2, for expression 'abc'. That is, both node 704 and node 724 indicate that 'a' in expression 'abc' has been detected in the input string, but Node 724 also indicates that '12' of expression 12[^y]*3 has been detected in the input string whereas Node 704 indicates that '12' has not been detected. A "more realistic" graph is illustrated in FIG. 7B, which includes many more arcs than shown in the graph of FIG. 7A.

Returning to FIG. 6, Node 606 corresponds to both Node 704 and Node 724 in the traditional DFA graph shown in FIG. 7A. If '12' of expression 12[^y]*3 has been detected, Node 610 will have been traversed and a command stored at Node 610 will have set a break. If '12' has not been detected, the break will not have been set. If Node 606 is reached, it is known whether '12' has been detected based on whether the break has been set. However, Node 606 does not care whether '12' has been detected prior to the detection of 'a'. Only when Node 604 is reached upon detection of a '3' does it matter whether a '12' has been already been detected without detecting a y to determine if the expression 12[^y]*3 has been detected in the input string.

The fixed regular expression 'abc' has a depth of three and Node 616 stores a command (Fixed Output) which is called to report the match for 'abc'. The fixed regular expression abc is also detected in the input stream through nodes 614, 618, 620 and thus the command (FixedOutput) to report the match of expression 'abc' is also stored in Node 620.

The walker component 302 will be explained for a search for the fixed regular expression. 'abc' in the input streams string of characters:

'12 abc 3\n12 xaaaabbbbccccy 3\n' in conjunction with the graph shown in FIG. 6, node descriptors shown in FIG. 8 corresponding to the graph nodes in FIG. 6 and the walking data shown in FIG. 9. The report of matches in the input stream is shown in FIG. 9. The compiler 304 assigns numbers to the expressions with expression 'abc' assigned the number 1, expression x[abc]*y assigned number 2 and expression 12[^y]*3 assigned the number 3.

Referring to FIG. 8, each node has an associated index, expression, offset, depth and state information. For example entry 814 corresponding to node 612, labeled Node 6 in the graph in FIG. 6 has {i0t-1e1o2d2s0: 'ab,c'} where:
 i0: index 0 (an index into the number of positions for this node)
 t-1: no thread has been assigned.
 e1: expression 1
 o2: offset 2 into the expression (the ',' shows the position in the 'ab,c')
 d2: depth 2, two characters have been traversed
 s0: no special state information.

The traditional DFA graph shown in FIG. 7A includes all of the nodes starting from a node that represents having matched the first constant part of the new expression, and any nodes that cannot be overlapped with existing nodes. As a traditional DFA only keeps state by remembering its current node, there is a unique node for each possible unique combination of partial matches represented.

The content search mechanism avoids this exponential problem through the use of a break state. In the content search mechanism, the fact that the first constant part of an expression is seen is remembered by a content search mechanism state, along with the start offset of the first constant part.

Returning to FIG. 6, the search of the input string of characters '12 abc 3' begins at the root Node 600. As the first character in the input stream is '1', arc labeled '1' in FIG. 6 is followed to Node 602 based on the arcs defined in the node descriptor for Node 0 in FIG. 8. Node 602 looks at the character at offset 1 in the input stream, that is, '2'. The string '12' is the first constant piece of the expression 12[^y]*3. The second constant piece of the expression 12[^y]*3 is 3. There may be an unlimited number of any characters except 'y' in the input stream between the first constant piece '12' and the second constant piece '3' which could result in an exponential explosion of the graph.

At Node 610, upon detecting the first constant expression '12', a break state is added by calling the FixedSet command to register a break state and store the start offset of the first constant expression '12', of the 12[^y]*3 expression. A break-based state is a type of state that remembers valid start and end offsets for a match which occurs in more than one piece, broken by a character class that is repeated. The break-based state keeps the content search macros graph from suffering from the DFA exponential explosion problem shown in FIGS. 7A and 7B.

The Done command also stored at node 610 (Node 5) is then executed to indicate that there are no further commands and the search of the input string of characters returns to the root node 600 (Node 0). In an alternate embodiment, if memory is of a primary concern and the start offset is not required, a flag can be used to indicate that the first constant part was found instead of storing the start offset. A space will transition flow back to node 600 (Node 0). There are implied arcs going back to node 600 (Node 0) on a space.

A break is added to node 610 (Node 5) by calling the FixSet command to store the start offset of the '12' expression, the first constant part of the '12[^y]*3' expression as follows:

```
FixedSet(break,delta):      // set break from (data_offset - delta)
break_class = graph_break_info[break].break_class;
// register this break for setting after kills are processed
walking_pending_breaks[num_walking_pending_breaks].break
    = break;
walking_pending_breaks[num_walking_pending_breaks].break_class
    = break_class;
walking_pending_breaks[num_walking_pending_breaks].start_offset
    = data_offset-delta;
num_walking_pending_breaks++;
```

The search of the input string continues at root Node 0. Referring to FIG. 8, upon detecting the character 'a' in the input string, arc labeled 'a' is followed from root node 600 (Node 0) to node 606 (Node 3). Upon detecting the character 'b' as the next character in the input stream at offset 4, arc labeled 'b' is followed from node 606 (Node 3) to node 612 (Node 6). At node 612 (Node 6), upon detecting the character 'c' at offset 5 in the input string, the arc labeled 'c' to node 616 (Node 10) is followed. As the abc expression is a fixed expression, at node 616 (Node 10), an output command (FixedOutput) is stored. This command stores the start offset, end offset, and expression number of the 'abc' expression in a report data structure with the start offset set to 3 and the end offset set to 5. The report generated using the report data structure for expression 1, that is, 'abc' is shown in FIG. 9.

The Done command also stored at Node 616 as shown in entry 822 in FIG. 8 is then called to indicate that there are no further commands. The next character " " (a space) is at offset 6 in the input stream. The search of the input stream continues at the root Node 600. The character '3' is at offset 7 in the input string. Upon detecting the character '3' in the input string at offset 7, arc labeled '3' is followed from the root Node 600 to Node 604. The second constant expression in the expression 12[^y]*3 has been detected in the input string, so the entry 806 corresponding to Node 604 stores the AddIfBreak command. The break-based state allows Node 604 to be traversed with two different interpretations dependent on whether the string '12' has been detected in the input stream.

The walker 302 matches expressions without caring whether the first part of the expression was found or not. Upon finding the second constant part of the expression, the state is checked to see if the first constant part was found by calling the command AddIfBreak. The AddIfBreak command gets the start offset stored for the break state as follows:

```
AddIfBreak(thread, break
if (walking_breaks[break].start_offset != OFFSET_INVALID) {
walking_state[thread].start_offset = walking_breaks[break].start_offset;
}
```

Breaks are "global" to the entire graph. If there was a match for the first constant expression, there is a complete expression match, if not, there is no match.

If the first constant part of the expression was found as it was at offset 1 when node 610 was reached, the start offset of the first constant part will have been stored in a walking break structure. This start offset is copied to a walking state structure. In one embodiment, the walking state structure stores a single start offset. In alternate embodiments, the walking state structure can store a flag or two start offsets, a list of start offsets or a start offset and a bitmask of intervening start offsets. The structure is dependent on the requirements of the expressions.

As this expression is non-fixed and there is a thread-based state, an output command is stored in node 604 (Node 2), which when executed stores the end and start offsets and the expression stored in the thread-based state in a report structure. The report issued using the offsets and expression stored in the report structure for expression '3' shown in FIG. 10 indicates that the expression was found in the input stream starting at offset 0 and ending at offset 7.

The Done command stored in node 604 (Node 2) indicates that no further commands are stored in the node. The parsing of the input stream continues from the root node 600 (Node 0) as described by traversing the graph character by character in the input stream until a match is found for the expression x[abc]*y at offset 25 through nodes 608, 614, 618, 624 and 622 (Nodes 4, 7, 11, 8, and 9 respectively).

In an expression, such as 'abc.*def', the '.*' represents an unlimited number of any character. This is referred to as the "any character" case and can lead to DFA graph explosion. Almost any character, such as "any character except newline" or "any character except tab, space, linefeed, or newline" can also result in DFA graph explosion. However, such instances are not as pronounced as with the "any character" case, because the nodes from the original DFA graph that can only be reached by passing through one of the characters that is not part of the "almost any character," without having matched the first part of the expression need not be provided again. To allow breaks to be used in the presence of unlimited "almost any character," the state that remembers that the first part of the expression has been seen is cleared upon detecting one of the exception characters in the input data, for example, 'y' in expression 12[$\hat{y}$]*3. In one embodiment, every occurrence of this character in the graph can include a command to indicate to the walker that the state is to be cleared.

Although the expression [abc]*y could be broken at [abc]*, a break has not been added in this embodiment. Thus, Node 614 is a duplicate of Node 606 for expression 'abc'. With the addition of the break, the graph would have less than 13 nodes, however, there is a performance impact in adding breaks, thus the compiler determines which breaks would be most beneficial. In this example, both expressions 'abc' and x[abc]*y would have required duplication inside the break of expression 12[^y]*3, but expression x[abc]*y only requires duplication of expression 'abc' nodes. The graph only specifies that a match is found, not which expression matched.

A "Kill List" is a list of characters that can clear a break. The compiler determines the best locations for breaks and their associated Kill Lists. The Kill Lists are known at compile time, a small subset of possible Kill Lists are used for a particular content search mechanism graph, and many of the used Kill Lists are used for multiple breaks. There are a total of 2^256 possible Kill Lists, but very few are actually used for any particular graph. The alternative (walking) kill lists are stored in a linked list of kill entries. A bit mask is also stored for the kill lists which shows which break classes (kill lists)
require a kill for each of the 256 possible input characters. Thus, an index of all of the actually used Kill Lists is stored with a data structure describing a break, called a break_class, and another data structure stores the actual Kill Lists. The break data structure will be described later in conjunction with FIG. 11.

The break commands are created once the node is determined. In one embodiment, the walker registers this character as a Kill character for this break at the time the break is set and whenever the character is seen, the walker clears the break.

Figure 11:
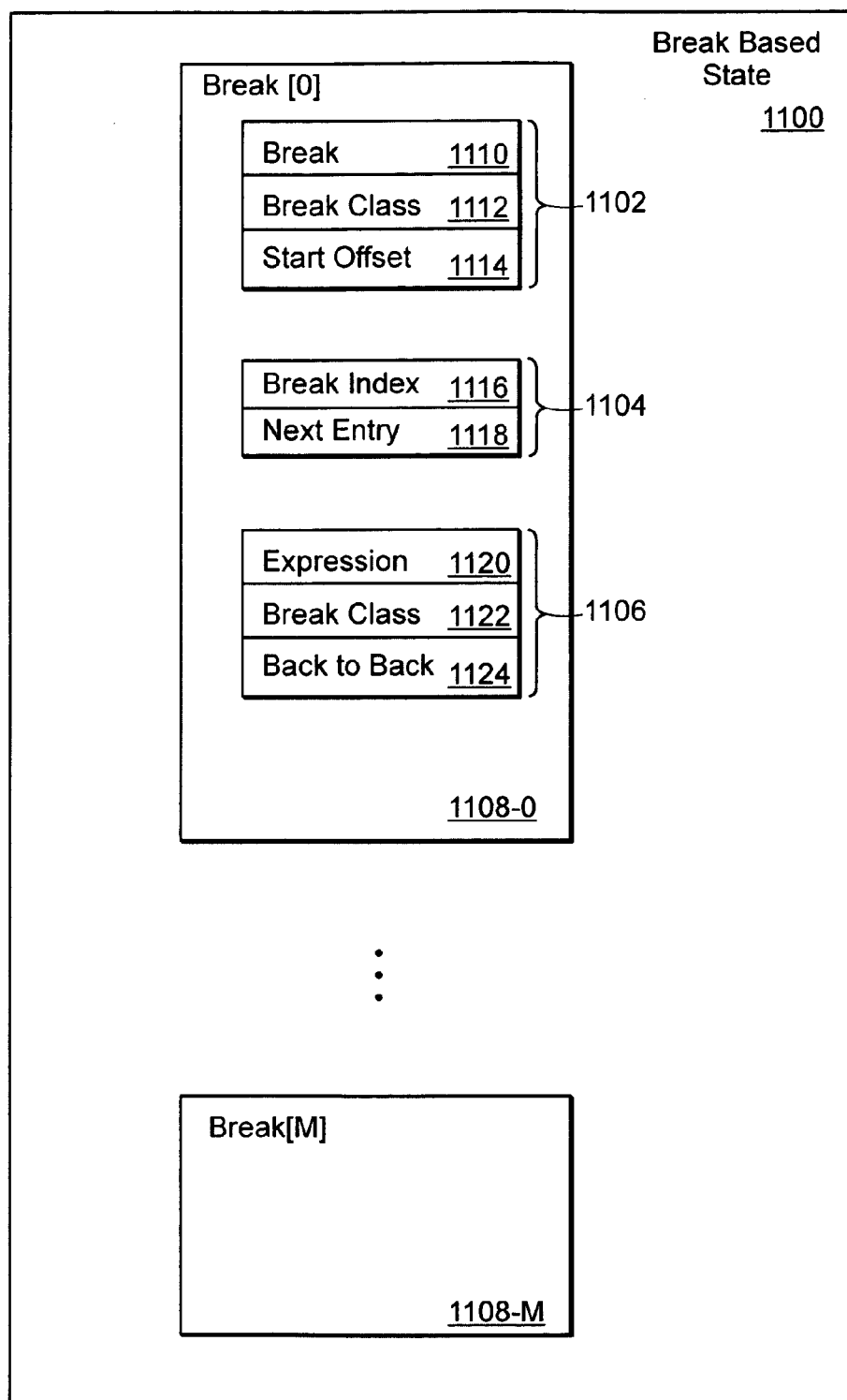
FIG. 11 illustrates the format of a break-based state.

FIG. 11 illustrates the format of a break-based state 1100 including respective break states 1108_0 through 1108_M for one or more breaks. Each break state 1108, in turn, includes pending breaks 1102, walking kill entries 1104, and graph break information 1106. The pending 1102 include: a break 1110, a break class 1112, and a start offset 1114 for the respective break. The walking kill entries 1104 store a break index 1116 and a next entry 1118 for the respective break. The graph break information 1106 stores an expression 1120, a break class 1122, and back-to-back 1124 for the break.

Break related commands such as, FixedSet, Set, SetIfBreak and AddIfBreak are provided to set breaks. The break related commands are stored in a node that corresponds to a start or end of a break, for example, referring to FIG. 6 and FIG. 8 a break command (FixedSet) is stored in entry 812 corresponding to Node 610 to be executed upon detection of '12', that is, the first constant expression in the expression 12[^y]*3. A break command (AddIfBreak) is also stored in entry 806 corresponding to Node 604 to be executed upon detection of 3, that is, the second constant expression in the expression 12[^y]*3. The addition of a break related command to a node is dependent on whether the depth of the graph corresponding to the expression is known and if a thread-based state is being used, that is, whether the expression is fixed or non-fixed.

Figure 12:
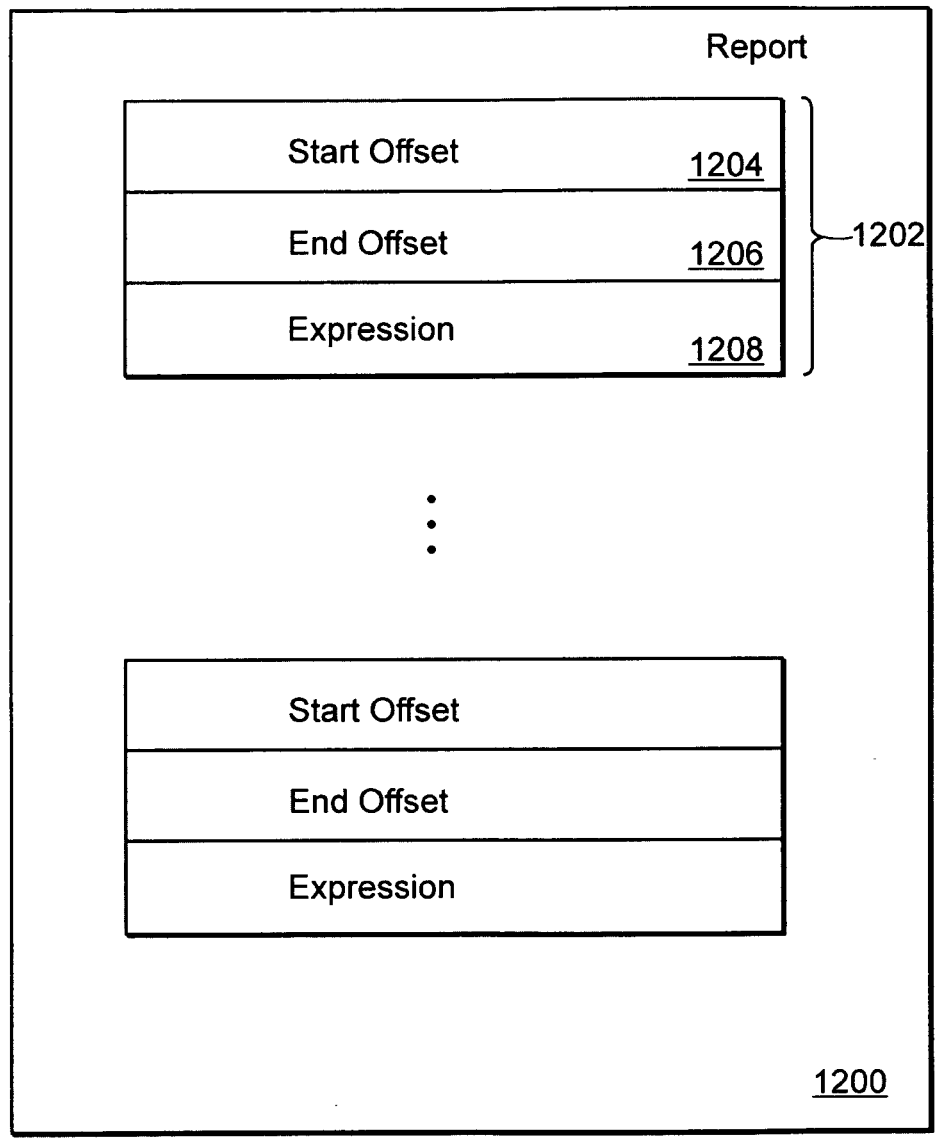
FIG. 12 illustrates the format of the report that is used by the walker process to report matches for expressions found in the input stream.

FIG. 12 illustrates the format of the report that is used by the walker to report matches for expressions found in the input string of characters. The report 1200 includes a plurality of report data structures 1202. Each data structure includes the following fields: start offset 1204, end offset 1206 and expression 1208 for storing the start and end offsets of expressions found in the input stream. An entry is output to the report by the walker 302 (FIG. 3) through the use of output and fixed output commands that are stored in nodes by the compiler 304 (FIG. 3).

If the minimum length of an expression which has a thread-based state is reached, an "Output (thread, expression)" command is stored at the node for execution. For example, an output command is stored in entry 820 corresponding to Node 622 for execution when the 'y' character in expression 2; that is, x[abc]*y is detected in the input stream. The following pseudo code illustrates how the output command stores the expression and offsets into a report data structure:

---

Output(thread,expression): // output from thread-- commit to report on clear
  if (walking_state[thread].end_offset == OFFSET_INVALID) {
    walking_state[thread].end_offset = data_offset;
    walking_state[thread].expression = expression;
  }

---

Similarly, if the minimum length of an expression that does not have a thread-based state is reached, a FixedOutput command is stored at the node for execution by the walker. For example, a FixedOuput command is stored in entry 822 corresponding to Node 616 for execution when the 'c' character in fixed length expression 1; that is, 'abc' is detected in the input string. The following pseudo code illustrates how the FixedOutput command stores the offsets and expressions in the report structure:

```
FixedOutput(expression, delta): // output-- commit to report immediately
report[report_offset].expression = expression;
report[report_offset].start_offset = data_offset-delta;
report[report_offset].end_offset = data_offset;
report_offset++;
    CheckReport(report_offset);
```

In addition to the commands already described, other commands can be stored in the graph for execution upon reaching a node. They include commands to indicate that the search continue with commands from a reference and thread-based state commands.

Thread-based state commands that can be stored in a node in the graph are provided to operate on the thread-based state. These commands include a command to add a new thread-based state, a command to clear the thread-based state and commit any pending outputs to the report, and a command to move a thread-based state to another thread-based state.

As the compiler is creating the intelligent nodes for the graph, if depth changes from a known value to an unknown depth a new thread-based state is created, and an "Add (thread, delta)" command is added to the node with the known part of the depth as the delta. For example, an Add command is added to the entry 810 corresponding to Node 608 which is reached when an 'x' is detected in the input string, that is, the first character of the x[abc]*y expression. This thread-based state stores the offset in the input stream where this expression starts, that is, the offset of character 'x' in the input string.

If an expression is no longer matching, a "Clear (thread)" command is added to the node. As shown in FIG. 8, the entry 802 corresponding to the root Node 600 has an implied "Clear (all)" command because the root node will be reached when no current expressions are matching and for breaks. The following pseudo code can be executed for the clear(thread) command:

Clear(thread): HI commit pending outputs to report, clear thread

```
Clear(thread): // commit pending outputs to report, clear thread
    if (walking_state[thread].end_offset != OFFSET_INVALID) {
    report[report_offset++] = walking_state[thread];
    CheckReport(report_offset); // see if the report is full
    }
walking_state[thread].start_offset = OFFSET_INVALID;
walking_state[thread].end_offset = OFFSET_INVALID;
```

The compiler usually adds done commands to nodes in the graph at the time the final output of the compiler is generated, that is, after the entire graph is created internally.

The content search mechanism has been described for an embodiment of a graph with one set of commands per node. However, whether commands are per node or per arc is dependent on performance/memory (time/space) considerations for the particular set of expressions. The discussion of commands is limited to their "high level" meanings and to the basic building blocks required. These building blocks can be combined and redundancies optimized in actual use.

The walker 302 knows all overlapping matches as it is walking and there can be more than one start and end offset remembered, if desired. Of particular interest is the case where two start and two end offsets are remembered, so that, if further scanning of the exact match is required, the walker can limit its search range to where the exact match could possibly occur. Alternatively no start offset need be saved if an application does not require it.

Figure 13:
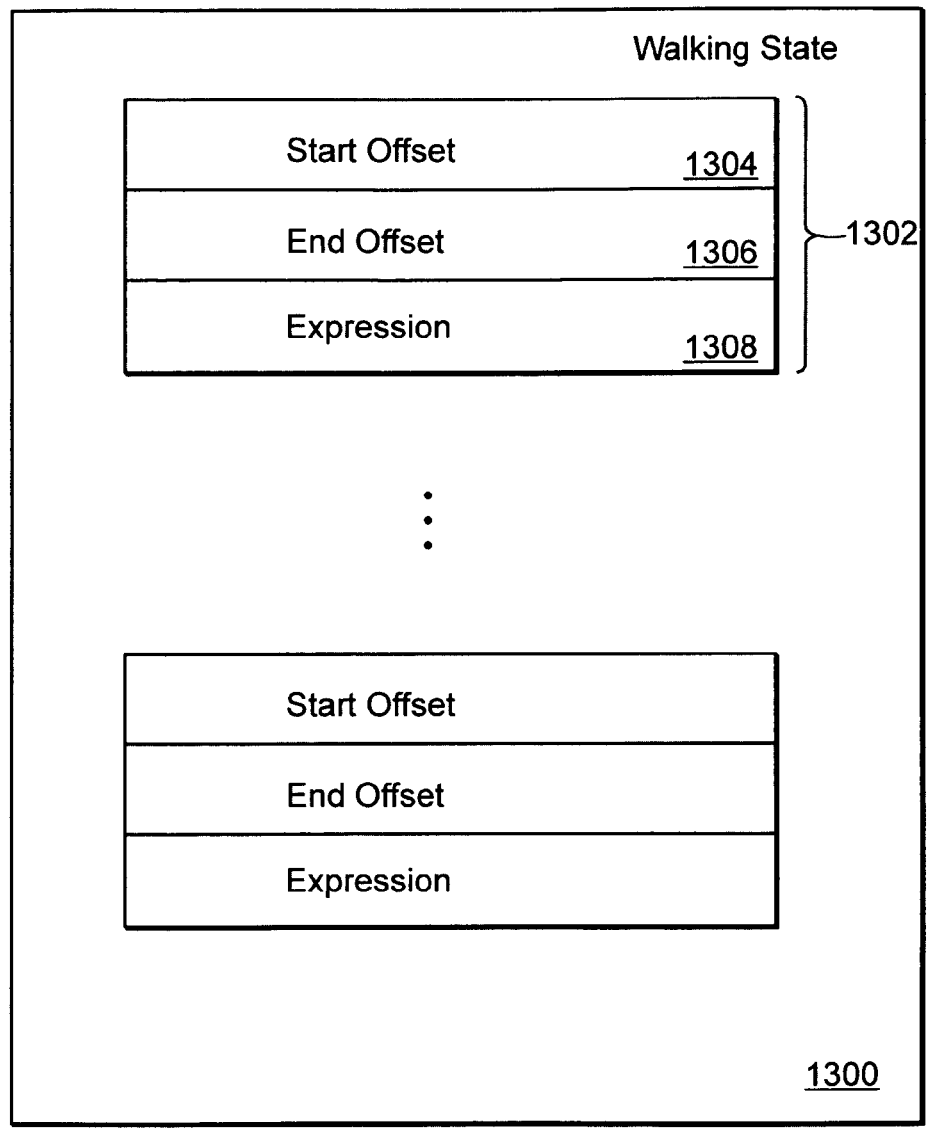
FIG. 13 is a block diagram of the walking state used by the walker process when searching for expressions in the input stream.

FIG. 13 is a block diagram of the walking state used by the walker component of the content search mechanism when searching for expressions in the input stream (string of characters). The walking state 1300 includes a plurality of entries 1302 with each entry including a start offset 1304, end offset 1306 and expression 1308. The walking state 1300 is used to store start and end offsets of expressions found when searching for expressions in the input stream.

Figure 14:
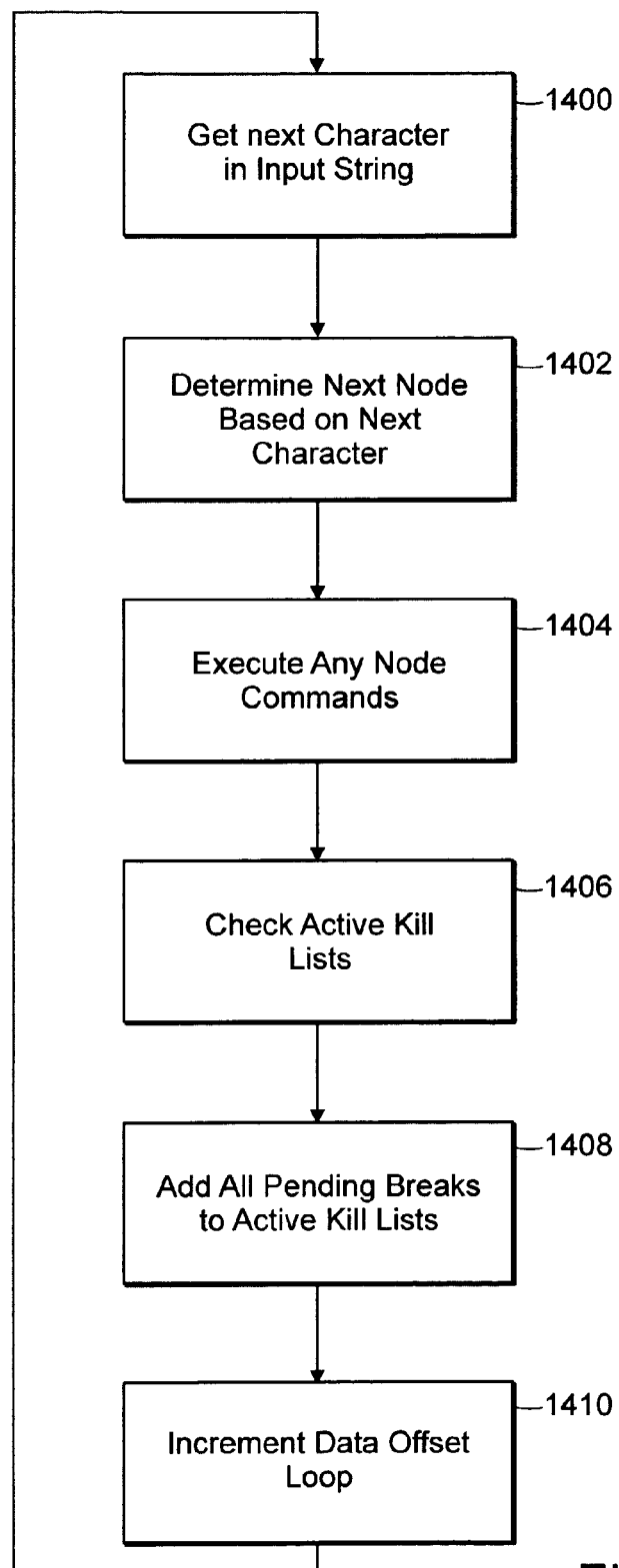
FIG. 14 is a flow chart illustrating the operation of the walker process according to the principles of the present invention.

FIG. 14 is a flow chart illustrating the operation of the walker 302 according to the principles of the present invention. The walker 302 either initializes its internal state to represent a fresh start, or loads its state from a saved state to represent a continuation of a previous input stream. Then, the walking process begins.

At step 1400, the walker gets 302 a new input character from the input steam. As the content search mechanism only reads each input character once, a complicated structure of input data is allowed, such as a linked list of buffers. When getting the new input character, the walker 302 also checks if the end of the input data has been reached.

At step 1402, the walker 302 determines the next node based on the new input character received. Although one embodiment can include compressed nodes which employ various techniques to determine the next node given the current node and an input character, the logical operation is "node=Nodes[node].arcs[byte]" assuming the input character is byte and Nodes is a table of all nodes containing arcs which are the next node for each input character.

At step 1404, the command associated with a node is executed. One or more commands can be associated with a particular node and each command is executed. The commands are either specified by the arc or by the node. This may cause some pending breaks to be scheduled for addition.

At step 1406, the active kill lists are checked.

At step 1408, all pending breaks are added to the kill lists. This registers the breaks to their corresponding break lists and marks them active. The reason for adding these later after checking the active kill lists, is so that the new entries are not killed just as they are being added. Alternatively only the node commands which do not generate new breaks are executed and the node commands that do generate new breaks are executed here.

Processing returns to step 1400, to get a new input character from the input data (input stream). The process continues until the input data is exhausted, a command terminates execution, or the report becomes full.

For example, to search the following exemplary input data strings (stream):

'2 abc 3\n12 xaaaabbbbccccy 3\n' for any occurrences of three different expressions: 'abc', x[abc]*y, and 12[^y]*3, the walker performs the steps shown in FIG. 14 and output the report shown in FIG. 10. Referring to FIG. 10, all three expressions were matched in the input stream. Each report entry 1000 in the report provides the start and end offsets and expression number of each expression. As shown in report entry 1000, the match for the first expression 'abc' was found at start offset 3 and end offset 5 in the input stream. The third expression 12[^y]*3 was found at start offset 0 and end offset 7 in the input stream. The second expression x[abc]*y was found at start offset 12 and end offset 25 in the input stream.

The interface between any one of the processors 202 shown in FIG. 2 and low-latency memory 118 is described in co-pending U.S. patent application Ser. No. 11/024,002, filed on Dec. 28, 2004 entitled "Direct Access to Low Latency Memory," the contents of which are incorporated herein by reference.

The additional state associated with each node allows the content search mechanism to traverse the same node with two different interpretations and results in the graph of nodes not becoming exponential. It also allows the offset of the input data to be remembered at various points, so that start offsets can be returned. This also allows additional qualifiers, such as "only allow this match within a certain offset range," to place restrictions on the reported matches. It also allows a user function to be called upon reaching a node, which can perform any desired user tasks, including modifying the input data or position. By using an "intelligent node" structure, tasks are performed "just-in-time" rather than requiring either a large graph size or a large amount of post-processing, while maintaining the benefits of a traditional DFA structure.

While walking the graph, the state machine also checks for additional commands on every node and executes them as a part of the search graph walk. A terminal state typically contains several commands to qualify the validity of a matched pattern based on the offset in the stream, prior history state and other protocol specific state variables. The pattern match can also be qualified by distance and range from a previous search.

In some embodiments, a pattern match can be limited to a predetermined range of offsets. Such a range-limited match occurs if the pattern occurs above a minimum offset, below a maximum offset, or between a minimum and maximum offsets. The range can be determined at the time of match, in a just-in-time scenario. Thus if a match is found, its respective offset can be compared to one or more predetermined range limits.

Using this improved DFA graph, protocol decode and pattern search is integrated. The graph walk state machine is implemented in software (walker component) but it leverages low-latency direct memory interface to the processor (core). This improves the overall performance of the graph walk while keeping the state machine flexible for different target applications.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network services processor comprising:
   a processor;
   a memory storing a Deterministic Finite Automata (DFA) graph having a plurality of nodes, each node of the plurality representing a state of a DFA state machine, from each state of the DFA state machine there is one valid state transition, the DFA graph having at least one node associated with a command that allows the processor to interpret the state of the DFA state machine represented by a subject node;
   the processor executing a walker process to traverse the DFA graph to search for a match defined by a regular expression in an input stream, the walker process having an associated walker state;
   upon the walker process reaching the at least one node associated with the command, the processor executing the command to set or check the walker state, the walker state being set or checked is different and in addition to the states of the DFA state machine represented by the plurality of nodes; and
   the processor interpreting the state of the DFA state machine represented by the subject node based on the walker state set or checked by the executed command.

2. The network services processor of claim 1, wherein the command is specified by the at least one node.

3. The network services processor of claim 1, wherein the command is specified by an arc in the DFA graph.

4. The network services processor of claim 1, further comprising a second memory accessible by the processor, the second memory storing the walker process.

5. The network services processor of claim 1, wherein the memory comprises a low-latency memory directly accessible by the processor.

6. The network services processor of claim 1, wherein the state includes start offset, end offset and depth into an expression.

7. The network services processor of claim 1, wherein the walker state further includes at least one of a thread-based state that is set or checked by the command for non-fixed-length expressions matching a variable number of characters and a break-based state that is set or checked by the command upon a match of a part of the regular expression.

8. A method for performing a search for a match for an expression in a string of characters comprising:
   generating a Deterministic Finite Automata (DFA) graph for searching for the expression, the DFA graph having a plurality of nodes, each node representing a state of a DFA state machine, from each state of the DFA state machine there is one valid state transition, the DFA graph having at least one node associated with a command that allows the state of the DFA state machine represented by a subject node to be interpreted;
   walking the DFA graph for each character in the string of characters to search for the match defined by the expression in the string;
   upon reaching the at least one node in the DFA graph associated with the command, executing the command to set or check a walker state associated with the walking, the walker state being set or checked is different and in addition to the states of the DFA state machine represented by the plurality of nodes; and
   interpreting the state of the DFA state machine represented by the subject node based on the walker state set or checked by the executed command.

9. A network services processor comprising:
   a memory storing a Deterministic Finite Automata (DFA) graph having a plurality of nodes, each node of the plurality representing a state of a DFA state machine, from each state of the DFA state machine there is one valid state transition, the DFA graph having at least one node associated with a command that allows the processor to interpret the state of the DFA state machine represented by a subject node;
   a content search mechanism, the content search mechanism comprising:
      a walker that walks the nodes in the DFA graph to search for a match in an input stream by executing a command stored in one of the nodes to set or check a walker state associated with the walker, the walker state being set or checked is different and in addition to the states of the DFA state machine represented by the plurality of nodes; and an interpreter that interprets the state of the DFA state machine represented by the subject node based on the walker state set or checked by the executed command.

10. The network services processor of claim 9 wherein the content search mechanism further comprises a compiler that generates the DFA graph.

11. The network services processor of claim 9, wherein the walker state further includes at least one of a thread-based state that is set by the command for non-fixed-length expressions, the non-fixed-length expressions matching a variable number of characters and a break-based state that is set or checked by the command upon a match of a part of the input stream.

12. A computer implemented method for traversing a deterministic finite automata-based (DFA) graph comprising:

traversing nodes in the DFA graph to search for an expression in an input stream based on pointers to next nodes stored in a node, each node representing a state of a DFA state machine, from each state of the DFA state machine there is one valid state transition, the DFA graph having at least one node associated with a command that allows the processor to interpret the state of the DFA state machine represented by a subject node;

upon detecting a command associated with the node, executing a function identified by the command to set or check a walker state, the walker state being set or checked is different and in addition to the states of the DFA state machine represented by the nodes; and interpreting the state of the DFA state machine represented by the subject node based on the walker state set or checked by the executed function identified by the command.

13. The computer implemented method of claim 12, wherein the command reports a match for the expression in the input stream.

14. The computer implemented method of claim 12, wherein the walker state further includes at least one of a thread-based state that is set or checked by the command for non-fixed-length expressions, the non-fixed-length expressions matching a variable number of characters and a break-based state that is set or checked by the command upon a match of a part of the expression in the input stream.

15. A computer implemented method for generating a deterministic finite automata-based (DFA) graph comprising:

parsing expressions to determine locations for breaks;

building the DFA graph by creating nodes and arcs to nodes, each node representing a state of a DFA state machine and each arc representing a valid state transition from each state;

inserting intelligence in a node by storing a command in a node corresponding to a break location, the break location being set or checked by the command upon a match of a part of the parsed expressions, the command being stored sets or checks a walker state that is different and in addition to the states of the DFA state machine represented by the nodes, the command being executed when the node is reached during a graph walk; and enabling a state of the state of the DFA state machine represented by a subject node to be interpreted based on the walker state set or checked by the command.

16. The computer implemented method of claim 15, wherein inserting further comprises storing another command at a node corresponding to a break exit.

17. The computer implemented method of claim 15, wherein inserting further comprises storing another command at a node corresponding to a thread change.

18. The computer implemented method of claim 15, wherein inserting further comprises storing another command at a node corresponding to an expression no longer matching.

* * * * *